United States Patent
Hirvela et al.

(10) Patent No.: US 8,595,306 B2
(45) Date of Patent: Nov. 26, 2013

(54) CONTENT MANAGEMENT FOR WIRELESS DIGITAL MEDIA FRAMES

(71) Applicant: AT&T Mobility II LLC, Atlanta, GA (US)

(72) Inventors: George Hirvela, Carrollton, GA (US); Melvin Frerking, Eastman, GA (US); Thomas Keathley, Dallas, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/648,460

(22) Filed: Oct. 10, 2012

(65) Prior Publication Data

US 2013/0035058 A1    Feb. 7, 2013

Related U.S. Application Data

(63) Continuation of application No. 12/325,619, filed on Dec. 1, 2008, now Pat. No. 8,316,091.

(51) Int. Cl.
*G06F 15/173* (2006.01)
*G06F 15/16* (2006.01)

(52) U.S. Cl.
USPC ............................ 709/206; 709/226; 709/229

(58) Field of Classification Search
USPC ......................................... 709/226, 229, 206
See application file for complete search history.

(56) References Cited

U.S. PATENT DOCUMENTS

| | | | |
|---|---|---|---|
| 5,909,491 A | 6/1999 | Luo et al. | |
| 6,509,910 B1 | 1/2003 | Agarwal et al. | |
| 6,717,567 B1 | 4/2004 | Bowden, III et al. | |
| 6,910,024 B2 | 6/2005 | Krishnamurthy et al. | |
| 6,961,046 B2 | 11/2005 | Bowden, III et al. | |
| 7,107,605 B2 | 9/2006 | Janik | |
| 7,155,679 B2 | 12/2006 | Bandaru et al. | |
| 7,539,156 B2 | 5/2009 | Leung et al. | |

(Continued)

FOREIGN PATENT DOCUMENTS

WO    00/21419 A2    4/2000

OTHER PUBLICATIONS

More Nokia Coolness: Digital Picture Frame. Nokia digital picture frame that interfaces with SMS or MMS capability in cell phone. Posted Sep. 24, 2003. http://www.russellbeattie.com/notebook/1004415.html. Last accessed Apr. 9, 2009, 2 pages.

(Continued)

*Primary Examiner* — Larry Donaghue
(74) *Attorney, Agent, or Firm* — Turocy & Watson, LLP

(57) ABSTRACT

System(s) and method(s) are provided for management of content(s) directed to a wireless digital media frame (WDMF). Management is facilitated by a service provided by a mobile network platform. A service subscription allows a subscriber to establish femto cell coverage in a location that host a subscribed WDMF(s); determine content(s) delivery preferences; and extend the service to a group of auxiliary subscribers. Various sources of content such as a mobile station, a non-mobile device, or a content server associated with a service platform (e.g., an internet service provider) can deliver content(s) and signaling. Integrity of content(s) and signaling is provided through access protocol(s) that exploits credentials associated with a source of content. Content(s) are managed through a content interface that conveys available content(s) in a source of content and an intended WDMF. Various alarm(s) can be delivered to a WDMF as a part of the content management service.

20 Claims, 19 Drawing Sheets

(56) References Cited

U.S. PATENT DOCUMENTS

| | | | |
|---|---|---|---|
| 7,844,286 | B1 | 11/2010 | Sennett et al. |
| 2002/0126150 | A1 | 9/2002 | Parry et al. |
| 2005/0027887 | A1* | 2/2005 | Zimler et al. ............ 709/249 |
| 2005/0159132 | A1 | 7/2005 | Wright et al. |
| 2006/0223495 | A1 | 10/2006 | Cassett et al. |
| 2007/0076665 | A1 | 4/2007 | Nair et al. |
| 2007/0105527 | A1 | 5/2007 | Nylander et al. |
| 2007/0220016 | A1 | 9/2007 | Estrada et al. |
| 2007/0226734 | A1 | 9/2007 | Lin et al. |
| 2007/0245125 | A1 | 10/2007 | Telesco et al. |
| 2007/0282907 | A1 | 12/2007 | Chambers et al. |
| 2008/0046649 | A1 | 2/2008 | Ito et al. |
| 2008/0052348 | A1 | 2/2008 | Adler et al. |
| 2008/0201420 | A1 | 8/2008 | Wong et al. |
| 2008/0205205 | A1 | 8/2008 | Chiang et al. |
| 2008/0208936 | A1 | 8/2008 | Lee et al. |
| 2008/0250431 | A1 | 10/2008 | Lee et al. |
| 2009/0094351 | A1 | 4/2009 | Gupta et al. |
| 2009/0276485 | A1 | 11/2009 | Casassovici et al. |
| 2010/0008295 | A1* | 1/2010 | Ji et al. ............ 370/328 |
| 2010/0022218 | A1 | 1/2010 | Chen et al. |
| 2010/0120447 | A1 | 5/2010 | Anderson et al. |
| 2010/0138747 | A1 | 6/2010 | Cheng et al. |
| 2011/0050417 | A1 | 3/2011 | Piccioni |
| 2011/0231441 | A1 | 9/2011 | Chambers et al. |

OTHER PUBLICATIONS

Batista. Nokia Snapshot of the Future. Nokia digital picture frame that interfaces with SMS or MMS capability in cell phone. Posted Sep. 29, 2003. http://www.wired.com/gadgets/miscellaneous/news/2003/09/60605. Last accessed Apr. 9, 2009, 2 pages.

The eStarling WiFi photo frame does Flickr. http://www.engadget.com/2006/01/10/the-estarling-wifi-photo-frame-does-flickr/. Last accessed Apr. 9, 2009, 3 pages.

Pix-Star http://www.pix-star.com/bluetooth-digital-photo-frame. Last accessed Apr. 9, 2009, 3 pages.

User Guide for Nokia Image Frame SU-7. Last accessed Feb. 27, 2009, 34 pages.

Nokia Imaging Enhancements—Fulfilling the Imaging Experience. Press Backgrounder, Mar. 2004. Last accessed Feb. 27, 2009, 3 pages.

eStarling Connected Wireless Digital Photo Frames http://www.estarling.com/products.sf. Last accessed Jul. 24, 2009, 2 pages.

eStarling launches Impact7 Wi-Fi Digital Photo Frame http://www.techgadgets.in/displays/2008/20/estarling-launches-impact7-wi-fi-digital-photo-frame/. Last accessed Jul. 24, 2009, 6 pages.

OA dated Mar. 29, 2011 for U.S. Appl. No. 12/325,619, 44 pages.
OA dated Feb. 1, 2012 for U.S. Appl. No. 12/325,812, 30 pages.
OA dated May 2, 2012 for U.S. Appl. No. 12/325,619, 24 pages.
OA dated Jul. 3, 2012 for U.S. Appl. No. 12/325,812, 23 pages.

* cited by examiner

CONTENT MANAGEMENT FOR WIRELESS DIGITAL MEDIA FRAMES

CROSS-REFERENCE TO RELATED APPLICATIONS

This application is a continuation application of co-pending U.S. patent application Ser. No. 12/325,619, entitled: "CONTENT MANAGEMENT FOR WIRELESS DIGITAL MEDIA FRAMES," and filed on Dec. 1, 2008. The entirety of this application is incorporated herein by reference.

TECHNICAL FIELD

The subject innovation relates to wireless communications and, more particularly, to management of multimedia content(s) directed to wireless digital media frame(s).

BACKGROUND

As a trend towards paperless graphic media continues to develop, digital picture frames gain preponderance among consumers, especially in view of the relatively low adoption threshold of digital picture frames which is driven at least in part by their ease of operation and relative low cost. To utilize a digital picture frame and consume their digital pictures, consumers need not be technologically savvy but rather possess basic knowledge of computer operation and access to a computer (e.g., a personal computer either tethered or portable, a computer kiosk, or the like), or have an understanding of operation of device(s) such as a digital camera that can be interfaced via a wired or wireless link with a digital picture frame. Utilization of a digital picture frame is based upon uploads of digital pictures from an external memory element to a memory element that resides in the digital picture frame. The external memory element is commonly a storage medium of a computer or device with digital pictures stored thereon. It is to be noted that the computer or device also can exploit a variety of removable external memory elements (e.g., a memory stick, a compact flash card, a secure digital card or the like) as source(s) of contents for the digital picture frame.

It is to be noted that uploading pictures from removable external memory elements facilitates picture exchange among end users of a digital picture frame and the sources of the pictures. Such exchange or dissemination of content directed to a digital picture frame can be enhanced through a networked content source. As an example, one or more of conventional digital picture frames can connect to the internet through a phone line to download pictures and other digital information for display. Nonetheless, utilization of networked sources of content for a digital media frame demands an additional layer of expertise, e.g., knowledge of how to access the networked sources, which can mitigate ease of operation of a digital picture frame, especially for the segment of consumers with a limited understanding or ability to manage networked resources. Even though remote content from a networked source can be conveyed to a digital picture frame, which may facilitate retaining the ease of operation from an end user perspective, conventional dissemination of content for picture digital frames through networked resources is typically limited and fails to accompany the pervasiveness and growth of both digital picture frame and networked resources markets.

DETAILED DESCRIPTION

Figure 1:
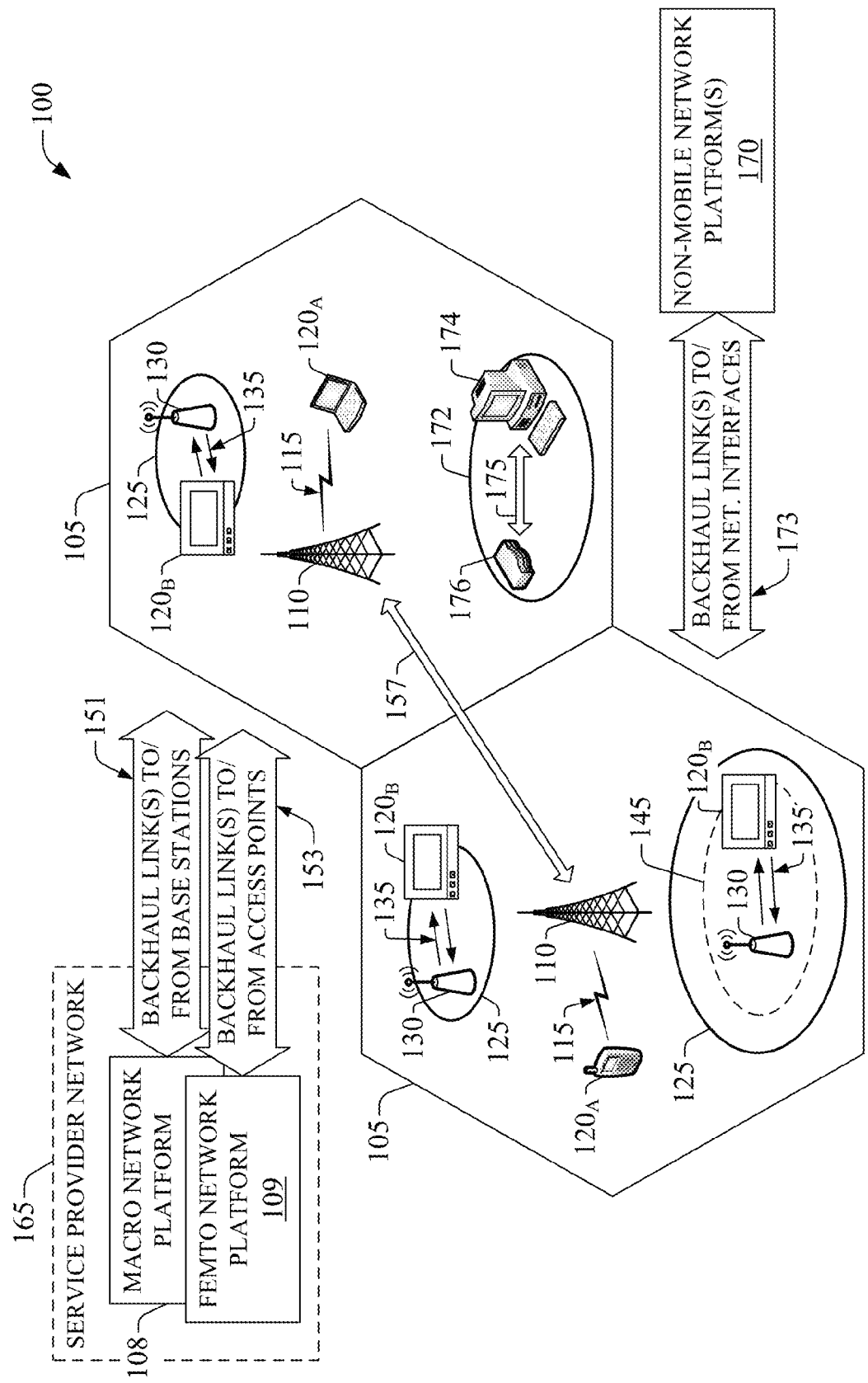
FIG. 1 is a block diagram of an illustrative communications environment that facilitates content(s) management in wireless digital media frames (WDMFs) in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data (e.g., content) and signaling streams can be packetized or frame-based flows.

Furthermore, the terms "user," "subscriber," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inferences based on complex mathematical formalisms) which can provide simulated vision, sound recognition, and so forth.

As it is discussed in greater detail below, the subject innovation providers system(s) and method(s) for management of content(s) directed to a wireless digital media frame (WDMF). Management is facilitated by a service provided by a mobile network platform. A service subscription allows a subscriber to establish femto cell coverage in a location that host a subscribed WDMF(s); determine content(s) delivery preferences; and extend the service to a group of auxiliary subscribers. Various sources of content such as a mobile station, a non-mobile device, or a content server associated with a service platform (e.g., an internet service provider) can deliver content(s) and signaling. Integrity of content(s) and signaling is provided through access protocol(s) that exploits credentials associated with a source of content. Content(s) are managed through a content interface that conveys available content(s) in a source of content and an intended WDMF. Various alarm(s) can be delivered to a WDMF as a part of the content management service.

The subject innovation provides system(s) and method(s) for management of content(s) directed to a wireless digital media frame (WDMF). Management is facilitated by a service provided by a mobile network platform. A service subscription allows a subscriber to establish femto cell coverage in a location that host a subscribed WDMF(s); determine content(s) delivery preferences; and extend the service to a group of auxiliary subscribers. Various sources of content such as a mobile station, a non-mobile device, or a content server associated with a service platform (e.g., an internet service provider) can deliver content(s) and signaling. Non-mobile devices can be stationary (e.g., a personal computer, or digital video recorder), and are provisioned through a non-mobile network platform. Content server(s) generally convey web-based content(s). Integrity of content(s) and signaling is provided through access protocol(s) that exploits credentials associated with a source of content. In addition, integrity of content(s) is further facilitated through approval cycles for auxiliary subscribers, and filtering of received content(s). Content(s) are managed through a content interface that conveys available content(s) in a source of content and an intended WDMF. Moreover, various alarm(s) can be delivered to a WDMF as a part of the content management service. Alarms can be generated by the content management service based upon public emergency information, or subscriber-based configuration.

Referring to the drawings, FIG. 1 is a block diagram of an illustrative communications environment 100 that facilitates multimedia content(s) management in wireless digital media frames (WDMFs) in accordance with aspects described herein. In an aspect, WDMF $120_B$ can consume (e.g., receive, deliver, store, render or play) content(s) in various multimedia formats which include, but not limited to, Joint Photo-graphic Experts Group (JPEG), Tagged Image File Format (TIFF), Portable Network Graphics (PNG), Graphics Interchange Format (GIF), Scalable Vector Graphics (SVG), Encapsulated Postscript (EPS), Portable Data Format (PDF), or almost any or any digital image format for pictures; Moving Picture Experts Group Phase 4 (MPEG-4), recommendation (Rec.) 601, Windows Media Video (WMV), or substantially any other video format for vide clips; MPEG-1 audio layer 3 (MP3) files for sound delivery, and so forth. Content(s) can be retained in a memory that can be native to the WDMF $120_B$ or external, yet linked to the WDMF $120_B$ through a link component (not shown). Additionally, WDMF $120_B$ can receive one or more command that facilitate operation and consumption of received or retained content(s). In an aspect, content(s) can be received through backhaul link 153. In addition, a WDMF 120B can utilize various technologies for terrestrial wireless communication, which include at least one of an advanced second generation (2.5G) telecommunication technology such as Enhanced Data Rate for Global System for Mobile Communications (GSM) Evolution (EDGE); a third generation technology (3G) like Third Generation Partnership Project (3GPP) Universal Mobile Telecommunication System (UMTS), 3GPP Long Term Evolution (LTE), Wideband Code Division Multiple Access (W-CDMA), or Ultra-broadband Mobility (UMB); advanced 3G such as Worldwide Interoperability for Microwave Access (WiMax); or a fourth generation (4G) technology such as for example Long Term Evolution (LTE) Advanced. Moreover, a WDMF $120_B$ can consume satellite-based traffic such as data originated from GPS, GLONNAS, or Galileo systems, conveyed through a deep-space link (not shown). In an aspect, WDMF $120_B$ can operate as an always-on device, with power supplied via a conventional power grid. Alternatively, or in addition, a rechargeable battery can supply power. WDMF $120_B$ can exploit conventional mechanism(s) to mitigate power consumption or preserve battery lifetime. Moreover, WDMF $120_B$ can be addressed through credential(s) within a native UICC card, or through an internet protocol (IP) addressing scheme.

Illustrative communications environment 100 includes macro cells 105 and femto cells 125 that provide wireless coverage and a confined area 172 (e.g., residential, commercial, industrial building, hospital, or the like) with non-mobile coverage; WDMFs $120_B$ are deployed within femto cell coverage areas 125 and served through femto access points (APs) 130. Coverage through macro cells 105 and femto cells 125 can be operated through a single service provider network 165. In communication wireless environment 100, each macro cell 105 is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Moreover, macro cells 105 also can be sectorized, even though such aspect is not illustrated. Macro coverage is generally intended to serve mobile wireless devices, like UE $120_A$, in outdoors locations. An over-the-air wireless link 115 provides such coverage, the wireless link 115 comprises a downlink (DL) and an uplink (UL), and exploits one or more predetermined bands of the radio frequency (RF) spectrum. User equipment $120_A$ can be substantially any user equipment that includes a system identity module (SIM) card, or a universal integrated circuit card (UICC), that provides with a SIM or universal subscriber identity module (USIM). Moreover, UE $120_A$ can be a mobile phone that can exploit at least one of an advanced second generation (2.5G) telecommunication technology such as Enhanced Data Rate for Global System for Mobile Communications (GSM) Evolution (EDGE); a third generation technology (3G) like Third Generation Partnership Project (3GPP) Universal Mobile Telecommunication System (UMTS), 3GPP Long Term Evolution (LTE), Wideband Code Division Multiple Access (W-CDMA), or Ultra-broadband Mobility (UMB); advanced 3G such as Worldwide Interoperability for Microwave Access (WiMax); or a fourth generation (4G) technology such as for example Long Term Evolution (LTE) Advanced. Additionally, UE 120A can also exploit WiFi for communication.

It is noted that a base station, its associated electronics, e.g., circuitry or components, and over-the-air coverage through wireless link(s) 115 operated in accordance to the base station specific telecommunication protocols (e.g., modulation and multiplexing schemes, modes of signal processing for data stream delivery and control) form a radio access network (RAN). Coverage provided through RAN can exploit radio frequency (RF) bands that are licensed (e.g., personal communication services (PCS), advanced wireless services (AWS), general wireless communications service (GWCS), and so forth) or unlicensed (e.g., the 2.4 GHz industrial, medical and scientific (IMS) band or one or more of the 5 GHz set of bands). In addition, base station 110 communicates via backhaul link(s) 151 with a macro network platform 108, which in cellular wireless technologies (e.g., GSM, EDGE, 3GPP LTE, 3GPP UMTS, or UMB) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). Moreover, macro network platform 108 includes components, e.g., nodes, gateways, and interfaces, that facilitate packet-switched (PS) (e.g., internet protocol (IP), asynchronous transfer mode (ATM) cell relay protocol) and circuit-switched (CS) traffic and control generation for networked cellular wireless communication through multiple deployed base stations.

Additionally, in illustrative communication environment 100, within one or more macro coverage cells 105, a set of femto cells 125 served by respective femto access points (APs) 130 can be deployed. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Confined coverage area 145 is generally associated with an indoor space such as a building, either residential (e.g., a house, a condominium, an apartment complex) or business (e.g., a library, a hospital, a retail store), which encompasses a setting that can span about 5000 sq. ft.

Femto AP 130 typically serves a few (for example, 1-5) wireless devices, which in the subject innovation include a WDMF $120_B$, within confined coverage area 125 via a wireless link 135 which encompasses a downlink and an uplink. Additionally, femto AP 130 can exploit RF bands that are licensed (e.g., personal communication services (PCS), advanced wireless services (AWS), general wireless communications service (GWCS), and so forth) or unlicensed (e.g., the 2.4 GHz industrial, medical and scientific (IMS) band or one or more of the 5 GHz set of bands). Femto network platform 109 can control such service, including registration and provisioning of femto APs 130. Service control, or management, is facilitated by backhaul link(s) 153 that connect deployed femto APs 130 with femto network platform 109. Backhaul pipe(s) 153 is substantially the same as backhaul link(s) 151. In an aspect of the subject innovation, part of the control effected by femto AP 130 includes measurements of radio link conditions and other performance metrics. Such measurements can be made available to femto network platform 109. In another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. Additionally, in an aspect of the subject innovation, LAC and RAC facilitate delivery of emergency broadcast messages to WDMF $120_B$ covered through a femto AP 130.

As part of femto coverage, packet communication(s) (e.g., voice and data traffic, and signaling as well) is typically paged/routed through a backhaul broadband wired network backbone 153 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 153 via a broadband modem (not shown). Through backhaul pipe 153, a femto AP 130 can handle substantially any quality of service (QoS) for heterogeneous packetized traffic (e.g., voice packet flows to a covered mobile, and data packet stream(s) directed to a WDMF). In an aspect of the subject innovation, femto AP 130 can display status indicators for power, active broadband/DSL connection, and connection to femto gateway, or femto gateway node. In another aspect, no landline is necessary for femto AP 130 operation.

Femto network platform 109 also includes components, e.g., serving nodes, gateway nodes, and interfaces, that facilitate packet-switched (PS) (e.g., internet protocol (IP)) traffic and signaling generation for networked telecommunication via access points 130. It is noted that femto network platform 109 and associated femto APs 130 can integrate seamlessly, through suitable interfaces, with substantially any packet switched (PS)-based and circuit switched (CS)-based network such as macro network platform 108. As an example, integrate into a 3GPP core network can be accomplished through conventional interfaces like Iu-CS, Iu-PS, Gi, Gn.

In communication environment 100, confined area(s) 172 can be served through a non-mobile network platform 120 which can include one or more of wide area networks such as a telephony network (e.g., public switched telephony network (PSTN)); an internet protocol-based network (e.g., internet service network, IP multimedia service network); or a broadband network (e.g., DSL internet service network, cable television network). Disparate coverage areas 172 can be connected to mobile network platform 120 through backhaul link(s) 173, which are substantially the same, or the same, as backhaul link(s) 151 and 153. Data traffic and signaling to and from device(s) 174 (for example, a personal computer) served by non-mobile network platform 120 can be facilitated by a non-mobile network interface 176 and an associated link component 175 that attaches the device(s). Link component 175 can be wired and can include single- or multi-line twisted-pair lines, such a FireWire bus; a general purpose interface bus (GPIB) line; Universal Serial Bus (USB) connectors, recommended standard (RS)-232 connectors; Ethernet connectors; digital visual interface (DVIs) cables; high-definition multimedia interface (HDMI) cables and so forth. Alternatively, or in addition, link component 107 can be wireless, including LOS links such as wireless infrared (IR), or non-LOS links. It is noted that non-mobile network platform can be interfaced, via a gateway node such as a packet data network gateway, with macro network platform 108 and thus access femto network platform 109.

Additionally, it is to be noted that macro network platform 108, as well as femto network platform 109, and non-mobile network platform 170 include components that facilitate data generation and delivery in accordance with modulation and multiplexing modes specific to the type of service(s) provisioned by each of such network platforms. In particular, network platforms 108, 109, and 170 can include application server(s), billing component(s), operation and maintenance component(s), interfaces or gateways between data generation components (e.g., cameras that capture live events such as a football game, a political speech, a surgical procedure that is part of a remote surgery event, web-based sources of content(s) . . . ), data delivery components, and so on. It should be appreciated that data generation components are termed packet data networks when such components deliver packetized data flows.

In an aspect of the subject innovation, the integration among macro, femto and non-mobile network platforms is exploited to remotely convey multimedia content(s) (e.g., photos, movie clips, sound clips) and signaling from a mobile station, e.g., UE $120_A$, or a non-mobile networked device, e.g., PC 170, to a WDMF $120_B$ served through femto cell coverage. Additionally, an agent that operates a mobile station or non-mobile device can receive information related to configuration and operation conditions of WDMF $120_B$, and content(s) directed thereto from a third-party user. Various aspects of communication of content(s) and signaling in accordance to the subject innovation are discussed in detail next.

Figure 2A:
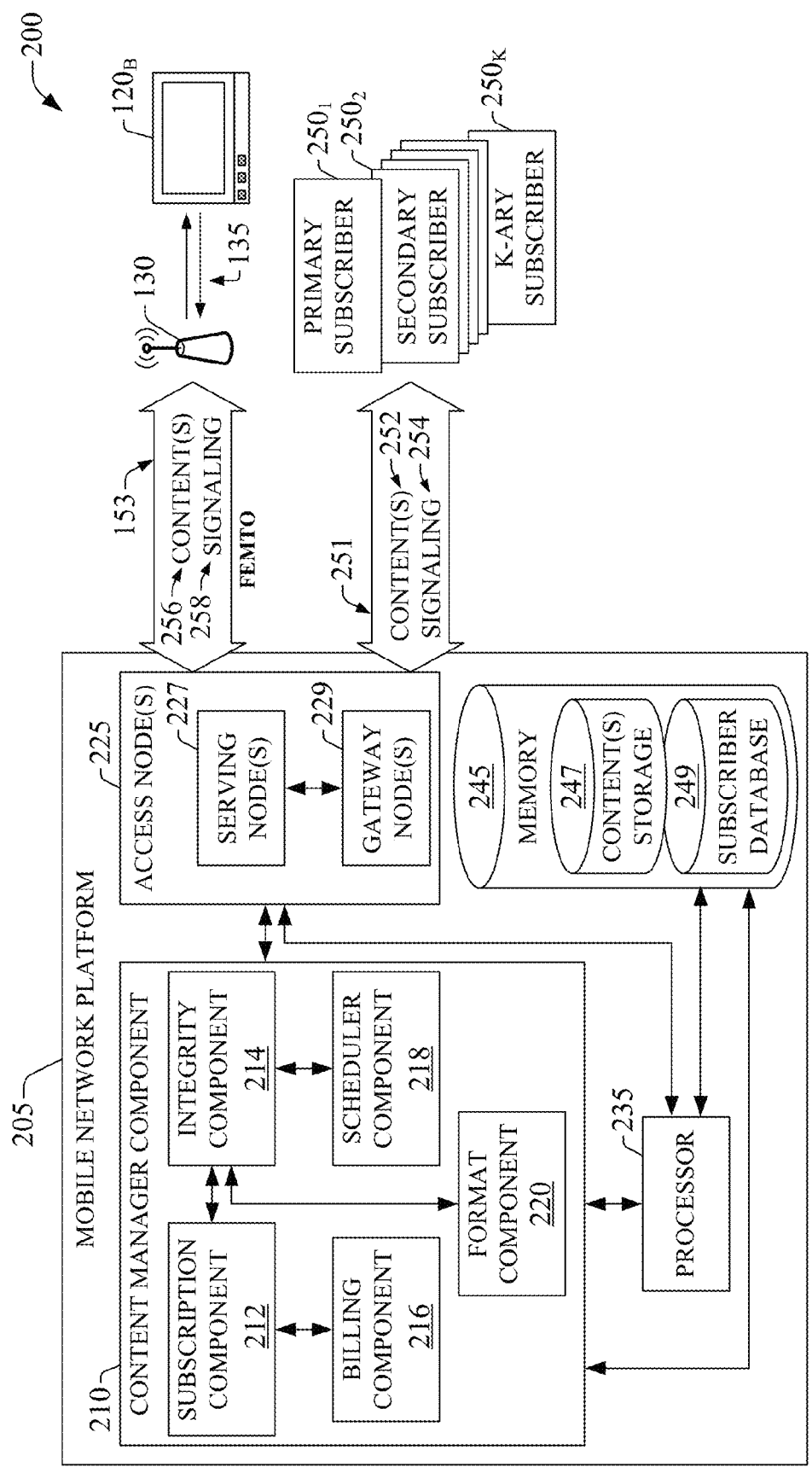
FIGS. 2A-2B are block diagrams of example systems that facilitate management of multimedia content(s) directed to a WDMF and alarm broadcast and communication in accordance with aspects described herein.
Figure 2B:
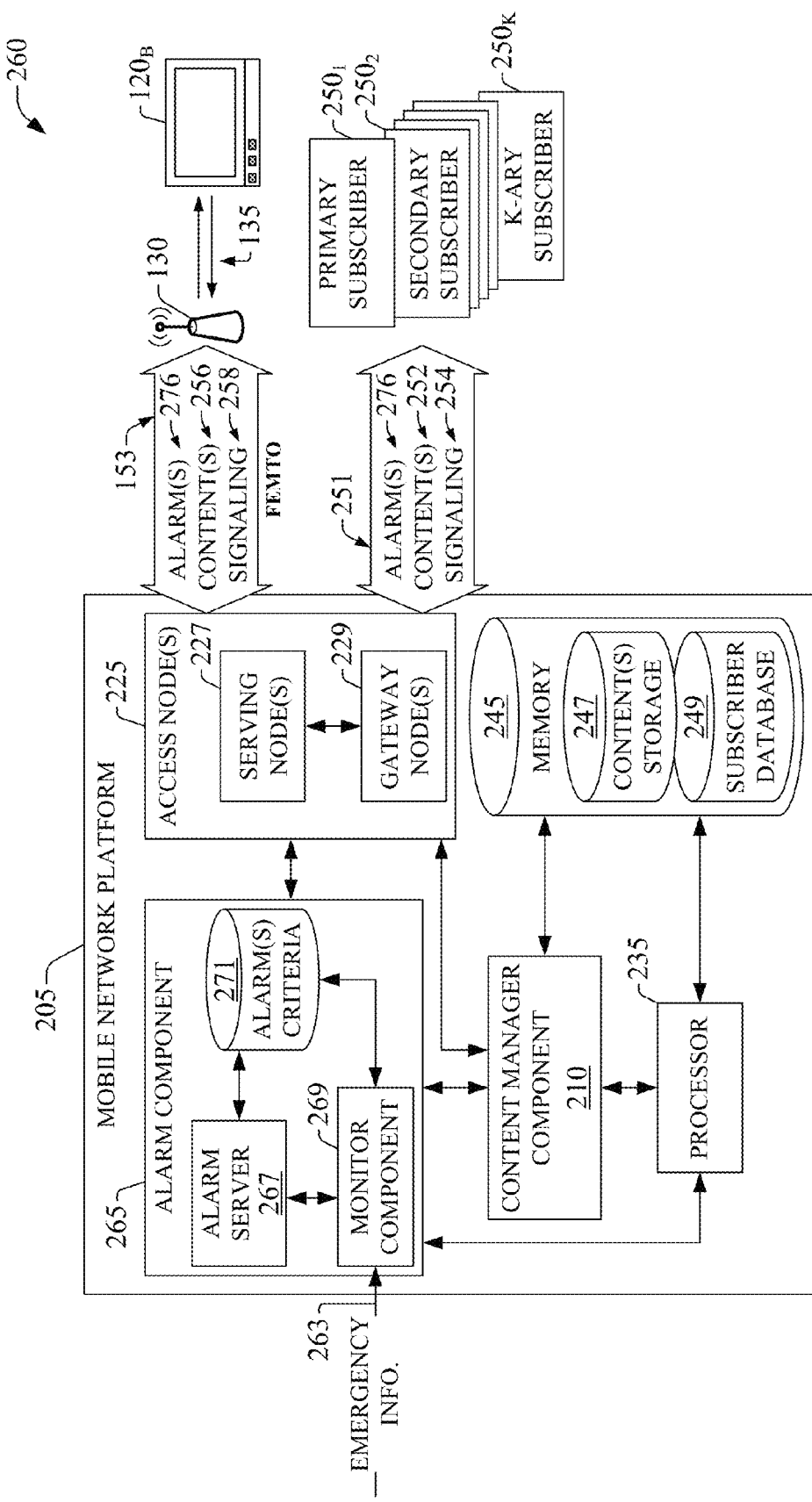

FIGS. 2A-2B are block diagrams of example systems that facilitate management of multimedia content(s) directed to a WDMF and alarm broadcast and communication. With regard to FIG. 2B, example system 260 facilitates management of content(s) directed to a WDMF $120_B$ through a mobile network platform 205, which can include a macro network platform 108 and femto network platform 109. Mobile network platform 205 includes a content manager 210 that provides content management service. To at least that end, content manager 210 includes a subscription component 212 that issues subscription(s) to the content management service. As a part of the subscription, femto cell coverage is provided to a location that hosts a subscribed WDMF. As another part of a subscription, subscription component 212 creates a subscriber profile or subscriber account (not shown), which is associated with the subscribed WDMF (e.g., WDMF $120_B$). In addition, subscription component 212 retains records of subscriber(s)'s service accounts and subscribed WDMF(s) in subscriber database 249 in memory 245. In an aspect of the subject innovation, a single subscription, or service account, to content management service can include multiple subscribers in a tiered scheme; namely, a primary subscriber $250_1$, also termed herein system subscriber, can authorize auxiliary subscribers such as a secondary subscriber $250_2$, a tertiary subscriber $250_3$, and so forth; the primary subscriber $250_1$ can act as service account administrator and determine access privileges to the content management service for dependent secondary subscriber $250_2$ through K-ary subscriber $250_K$ (K is a positive integer). At the time of subscription issuance, or during any time throughout the lifetime of a subscription, an indication can be received from a subscriber as to whether additional subscribers are to authorized manage content(s) via the content manager component 210. As an illustration, a primary subscriber $250_1$ can be a child of an individual that hosts a WDMF (e.g., WDMF $120_B$), this primary subscriber $250_1$ can authorize in a content service subscription a secondary subscriber $250_2$ who can be a primary subscriber's sibling. It should be appreciated that other individuals associated with the host of the WDMF can be authorized as a tertiary subscriber; for instance, a personal daycare nurse or a family physician, who can deliver multimedia clips that include video and sound related to treatment or consultation(s) related to the WDMF host. As another example, partners in various leisure activities such as golf, bridge, chess, dancing, literacy club, or the like, can be authorized as tertiary subscribers, in order to manage content(s) associated with the various leisure activities; e.g., a chess play, a poem, video and audio clips of a dancing session, and so forth.

In an aspect, to supply at least one of content(s) or signaling for delivery, and to ensure integrity of content(s) and operation of mobile network 205, content manager component 210 includes an integrity component 214 that, through various mechanisms, validates (i) a subscription of a source of content(s) or signaling such as a K-ary subscriber $250_K$ and associated apparatus (e.g., a mobile device $120_A$ or non-mobile device 170) to deliver the content(s) or signaling; and (ii) credentials associated to the source of content(s) and signaling; a credential or credential type is specific to the source of content; e.g., SIM or USIM credentials. It should be appreciated that validation of signaling 258 can include a determination whether a command for WDMF $120_B$ conveyed through signaling 258 is supported, or can be executed, by WDMF $120_B$. In an aspect of the subject innovation, content integrity is further supported, at least in part, through format component 220 which can switch a format and resolution of received content(s) to a format and resolution that can be consumed (e.g., rendered or played) through WDMF $120_B$. Format component 220 also can compress, and subsequently decompress, received content(s) in order to adjust size of content(s) to traffic conditions over a backhaul link in which content(s) is transported, or conditions of radio link 135 in the confined area served by femto AP 130 and that hosts WDMF $120_B$. In an aspect, radio link conditions can include signal-to-noise ratio (SNR), signal-to-noise-and-interference ratio (SNIR), DL pilot reference signal over thermal noise (DL-PRSOT), and UL-PRSOT; it should be appreciated that for UL the term "sounding reference signal" can be adopted instead of "pilot reference signal," the former replicates terminology generally used in macro coverage. Moreover, content(s) compression can facilitate to store such content(s) efficiently in content(s) storage 247 within memory 245.

Format component 220 can determine a specific format utilized for received content(s) 252 (e.g., MPEG-4, Rec. 601, MP3, and so on), and associated quantization such as color quantization, sound quantization, or data quantization. In an aspect, analysis can be based on a set of received packets within a data stream and blind decoding with a set of hypothesis formats; the set of hypothesis formats can be extracted from subscription information, provided by a primary subscriber associated with WDMF $120_B$ and stored in a subscriber account related thereto. Once format of content(s) 252 has been determined, format component 220 can retrieve a set of one or more formats that are supported in WDMF $120_B$ from a subscriber account associated thereto in order to assess whether to upconvert or downcovert the resolution (e.g., number of received pixels per image) of received contents, for example, in order to match display resources (e.g., display real estate) of WDMF 120B. Such conversion can be effected according to specific algorithms (e.g., inverse discrete cosine transform (DCT) with subsequent filtering) retained in memory 245. In addition, format component 220 can utilize a determined format (e.g. a preferred format) to consume multimedia content(s) in a WDMF to resize data packet frames (e.g., conversion from high bitrate to low bitrate data) that convey content(s) 256 to the WDMF or expected or intended image and sound quality (e.g., constant bitrate to variable bit rate). At least two advantages of the foregoing format adjustment of content(s) directed to wireless WDMF $120_B$ are the following. (i) A subscriber (e.g., primary subscriber $250_1$, secondary subscriber $250_2$ through K-ary subscriber $250_K$) is not constrained to a specific set of formats for content(s) 252. (ii) Operational resources in WDMF $120_B$ can be optimally utilized which provide an end user a rich experience and can increase a perceived user experience in connection with content management service provided, at least in part, through content manager component 210.

Alternatively, it is to be noted that content manager component 210 can disable the foregoing operation of format component 220 when an indication to do so is received at a time content management service is subscribed. In such a scenario, an error message can delivered to a source of content(s) when format of received content(s) fails to be supported by an intended WDMF $120_B$.

To automatically adjust format of content(s) 252, format component 220 can employ artificial intelligence. The term "intelligence" refers to the ability to reason or draw conclusions about, e.g., infer, the current or future state of a system based on available information about the system. Artificial intelligence (AI) can be utilized to identify a specific context or action, or generate a probability distribution of specific states of a system without human intervention. To infer optimal formats (e.g., data frame size, packet bitrate, etc) for transacted content(s) delivery in order to achieve optimal mobile or non-mobile device performance, optimization component 615 can rely on artificial intelligence techniques, which apply advanced mathematical algorithms—e.g., decision trees, neural networks, regression analysis, for configuration weight or probability determination; principal component analysis (PCA) for feature and pattern extraction, cluster analysis, genetic algorithm, and reinforced learning—to information on a set of content(s) 252 data streams.

In particular, format component 220 can employ at least one of various methodologies for learning from data and then drawing inferences from the models so constructed, e.g., Hidden Markov Models (HMMs) and related prototypical dependency models, more general probabilistic graphical models, such as Dempster-Shafer networks and Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The foregoing methods can be applied to identify (e.g., determine a statistical weight) different bitrates and compression schemes for video and sound streaming; pixel resolution; to increase user perceived experience, which can be measured via subscriber attrition rates and new-subscriber gains.

To further facilitate management of content(s) directed to WDMF $120_B$, content manager component 210 also includes scheduler component 218 that can facilitate delivery of content(s) from a mobile-network plane perspective: Scheduler component 218 conveys content in accordance to various operational factors like pattern of content(s) traffic to subscribed WDMFs, wherein a pattern of traffic includes quality of service (QoS) associated with a served WDMF; radio link 135 condition(s) of subscribed WDMFs, which can be determined via femto AP 130; and so forth. In addition, scheduler component 218 can also control content(s) delivery from a subscriber-plane perspective via predetermined preferences, or delivery settings, established by a primary subscriber $250_1$.

In an aspect of the innovation, subscription(s) incurs charges when issues, the charges are assessed and administered by billing component 216. It is to be noted that charges can include on-the-cloud storage fees; e.g., charges for content(s) stored in memory 245. Billing component 216 can adopt, or offer, one or more pricing schemes such as (i) flat fee for a specific volume of managed content(s), or traffic, or for a specific time interval (e.g., a week, a month, a quarter . . . ) irrespective of traffic magnitude; (ii) usage-based fee, with predetermined charges for each managed item; or (iii) charges against a subscriber(s)'s prepaid fee for content management. In addition, billing component 216 can assess promotional charges (e.g., discounted price, free-of-charge) for selected subscribers, such as loyalty subscribers of femto coverage service; or implement almost any other pricing differentiation schemes like segmented pricing. It should be appreciated that, in an aspect, billing component 216 can be a part of a billing server that manages charges for macro or femto services through mobile network platform 205.

In an aspect of the subject innovation, content manager component receives multimedia content(s) 252 and signaling 254 through access node(s) 225. It should be appreciated that content(s) 252 and signaling 254 are conveyed via communication element 251, which is a communication conduit that can embody either backhaul link 151 or 171, or both, or RAN elements, and at least a portion of a non-mobile network. In an aspect, content(s) and signaling are received through serving node(s) 227 and relayed to content manager component 210 via gateway node(s) 229; communication among serving node(s) 227 and gateway node(s) 229 is facilitated by a reference link (e.g., Gn in EDGE or 3GPP UMTS). To deliver content(s) 256—which can be a reformatted or compressed version of received content(s) 252, or can be the same as received content(s) 252—and signaling 258, which can include received signaling 254, content manager component 210 delivers the content(s) and signaling to gateway node(s) 229, which is then relayed to serving node(s) 227 and delivered to WDMF $120_B$ through backhaul link 153 to femto AP 130.

Processor 235 confers at least in part the functionality of almost any component within mobile network platform 205, while memory elements (not shown) within memory 245 can retain data structures, code instructions, and algorithms related to such functionality; the processor is configured to exploit information (e.g., execute code instructions) that reside within the memory elements in order to provide specific functionality to the mobile network platform 205.

FIG. 2B illustrates a block diagram of example system 260 which facilitates broadcast of alarm(s) to a set of WDMFs covered through femto cell wireless service through provided via mobile network platform 205; example system 260 also facilitates management of content(s) directed to one or more WDMFs $120_B$ in accordance with aspects described herein. It is noted that in example system 260, components and elements with like numerals as in previously discussed embodiments or example systems possess almost the same or the same functionality and operate in substantially the same or the same manner as previously described. In example system 260, alarm component 265 can broadcast alarm(s) 276 to a set of WDMF(s) $120_B$ served through femto AP 130. It should be appreciated that while alarm component 265 is illustrated as external to content manager component 210, the alarm component 265 can reside within content manager component 210. In example system 260, alarm server 267 generates alarm based at least in part on alarm(s) criteria 271 and received emergency information 263. Alarm(s) 276 can be conveyed in a dedicated control channel through access node(s) 225, via broadband backhaul link 153, to femto AP 130 and served to WDMF $120_B$. Alarm(s) 276 can be implicit, embodied in a set of reserved bits in a control channel frame or packet header, such set of bits can trigger display of specific alarm message(s) in WDMF $120_B$. Alternatively, or in addition, alarm(s) 276 can explicit and delivered, with alarm content(s) conveyed within a short message service (SMS) communication, a multimedia message service (MMS) communication, or a Multimedia Broadcast Multicast Service (MBMS) communication. It should be appreciated that alarm component 265 can exploit features of content manager 210 such as format component 220, to compress alarm(s) 276 to improve communication integrity of the alarm(s) message; and scheduler component 218 to preempt signaling 258 in control channels, or delivery of content(s) 256 in transport channels in backhaul link(s) 153.

With respect to alarm criteria 271, such criteria can be based at least in part on guidelines or protocols from government entities (e.g., Federal Emergency Management Agency (FEMA); National Hurricane Center; Federal Bureau of Investigations (FBI); local authorities such as police and firefighters; and so forth) related to measures to be undertaken during an emergency situation. Such protocols can be set forth as a part of the Warning, Alert, and Response Network (WARN) Act. With respect to emergency information 263, monitor component 269 can receive such emergency information, which can include type of emergency (e.g., fire hazards, terrorist attacks, floods, hurricane watch, heat wave, snowstorm watch, school shootings . . . ); affected locations; response management instructions or integrity proceedings (e.g., evacuation, shelter maneuver(s) . . . ); or the like. In an aspect of the subject innovation, to receive emergency information 263, monitor component 269 can exploit an access gateway node, which can be a part of gateway node(s) 229. At least one advantage of delivery of alarm(s) 276 to WDMF $120_B$ as described herein is that mobile network platform 205 can exploit location information of provisioned femto access points; thus, alarm(s) can be significantly accurately multicasted or broadcasted to affected locations, with alarm(s) message(s) customized via alarm server 267, for example, to such affected locations.

In example system 260, alarm component 265 also can communicate subscriber-based alarm indication(s), or alarm(s) 276, to WDMF $120_B$. To that end, a primary subscriber $250_1$ can configure alarm criteria 271 to include a set of one or more specific events and associated schedules times, associated with an end-user of WDMF $120_B$. In an aspect, subscriber-based alarm(s) 276 can be employed to establish a calendar of noteworthy events, or to determine a set of reminders. As an example, alarm(s) 276 can be delivered to remind the end user of a specific appointment, like a visit to the dentist, a time for social event like ballroom dance or a Little League baseball game, etc. It is noted that mobile network platform 205 can limit a number of configured alarm(s) event(s) to mitigate excessive signaling associated with implementation of subscriber-based alarm(s).

In an aspect of the subject innovation, WDMF $120_B$ also can communicate alarm(s) 276 to all subscribers $250_1$-$250_K$ linked thereto. An example of such end user-based alarm(s) 276 is a distress call facilitated via push-to-talk; the latter is routed through femto AP 130 and backhaul link(s) 153, conveyed to subscribers $250_1$-$250_K$ via access node(s) 225 and link(s) 251. As part of push-to-talk, subscribers $250_1$-$250_K$ can receive at least one of voice from the end user, a specific ringtone, a preset SMS communication, or a preset MMS message; specific SMS and MMS messages can be remotely configured through content manager component 210 by a primary subscriber associated with the WDMF $120_B$; for instance, preset distress call messages can be entered at a time of service subscription and uploaded to WDMF 120B through femto AP 130.

Monitor component 269 can probe strength of radio link 135 and determine whether the strength, or conditions, of radio link 135 are adequate to communicate alarm(s) to WDMF 120B or subscribers $250_1$-$250_K$. When conditions are below network-based predetermined threshold(s), an alert notification (e.g., SMS communication, MMS communication, a ringtone, an email, and instant message . . . ) is delivered to each of subscriber (e.g., $250_1$ through $250_K$) associated with WDMF 120B. To probe radio link 135 conditions, monitor component 269 can request femto AP to scan UL pilot reference signal(s) transmitted by WDMF $120_B$, such request can be part of a control channel and is conveyed through signaling 258. To determine DL conditions, monitor component 269 can convey, through signaling 258, a command to femto AP 130 to transmit a DL pilot reference and receive a radio link or channel quality indicator (CQI) from WDMF 120B. It should be appreciated that to reduce complexity within WDMF 120B, with the ensuing reduction in costs thereof, DL radio link conditions can be adopted as the DL conditions.

Processor 275 confers, at least in part, the functionality of almost any component within mobile network platform 205, while memory elements (not shown) within memory 245 can retain data structures, code instructions, and algorithms related to such functionality; the processor is configured to exploit information (e.g., execute code instructions) that reside within the memory elements in order to provide specific functionality to the mobile network platform 205.

Figure 3:
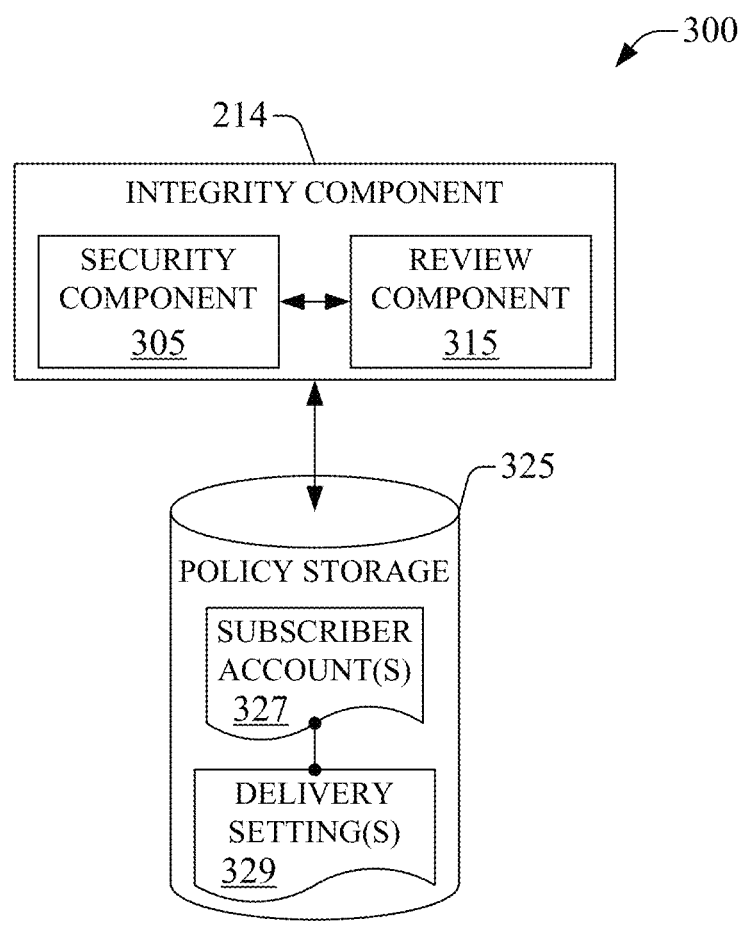
FIG. 3 is a block diagram of an example embodiment of an integrity component that facilitates, at least in part, management of content(s) directed to a WDMF in accordance with aspects described herein.

FIG. 3 is a block diagram of an example embodiment 300 of integrity component 214 in accordance with aspects described herein. In example embodiment 300, integrity component 214 can include a security component 305 that validates access to a subscriber account and secures delivery of content(s) (e.g., content(s) 252 and 256) and signaling (e.g., signaling 254 and 258). To at least that end, security component 305 can utilize various security protocols, or access protocols, based upon an apparatus a subscriber (e.g., primary subscriber 205) employs to convey content(s) 252 and signaling 254. In an aspect, security component 305 can validate an association among credential(s) of a WDMF and credential(s) of a mobile station (e.g., UE $120_A$) employed to deliver content(s) 252 and signaling 254; the association can be validated through inspection of subscriber account(s) 327 within policy storage 335. Credential(s) can include substantially any code or token, or light weight file (e.g., a digital certificate) that identifies an apparatus uniquely; for instance, an international mobile subscriber identity (IMSI), an integrated circuit card identity (ICCID), an international mobile equipment identifier (IMEI), a mobile directory number (MDN), a mobile identification number (MIN), a serial product number such as mobile identity number (MEID), a Telecommunications Industry Association (TIA) electronic serial number (ESN), a password, public and private encryption keys, etc.

In another aspect, security component 305 can administers connection establishment of a subscriber's device employed to convey content(s) 252 and signaling 254 with mobile network platform 205. To implement secure attachment and management of content(s) directed to a WDMF $120_B$ with mobile network platform 140, security component 305 can utilize a set of security protocols, or access protocols, which can be retained in memory 245. In addition, security component 205 can exploit credentials received from a subscriber device as part of a security protocol, or access protocol. Security protocols can include at least one of encryption or password protection. As an example, a set of security protocols can include, but is not limited to including, Internet Protocol Security (IPsec), Secure Socket Layer (SSL), Transport Layer Security (TLS), Secure Shell (SSH), Secure File Transport Protocol (SFTP), Secure Copy (SCP), and so forth. It is to be noted that security component 305 can exploit one or more of the illustrative security protocols to establish a virtual private network (VPN) for device-to-WDMF or platform-to-WDMF tunnel of content(s) (e.g., content(s) 252) and signaling (e.g., signaling 254) associated with content(s) management described in the subject innovation.

In example embodiment 300, integrity component 214 also includes a review component 315 that provides (i) a redundancy layer for integrity of content(s) intended for a WDMF (e.g., WDMF $120_B$), and (ii) a mechanism to analyze such content(s). In an aspect, as part of functional feature (i), review component 315 can implement a spam filter to mitigate delivery of undesired content(s) to the WDMF. Spam filter preferences related to unauthorized content(s) directed to WDMF that are to be preempted can be included in subscriber-based delivery setting(s) 329, and configured by a primary subscriber. In another aspect, as a part of functional feature (ii), review component 315 can exploit delivery setting(s) 329 to determine whether content(s) or signaling submitted by a K-ary subscriber $250_K$ is to be approved prior to delivery to a WDMF $120_B$. Such an approval cycle, or act, can be configured within delivery setting(s) 329, which can be received at a time subscription to a content(s) management service is issued to a primary subscriber; the approval cycle for content(s) can include primary subscriber intervention, whereas approval for signaling can exploit a look-up mechanism of commands allowed to be utilized by a K-ary subscriber. It should be appreciated that the primary subscriber can modify delivery setting(s) 329 at substantially any time through subscriber account(s) 327; modification can be accomplished through suitable signaling 254 received from a device employed to access content(s) management service.

Figure 4:
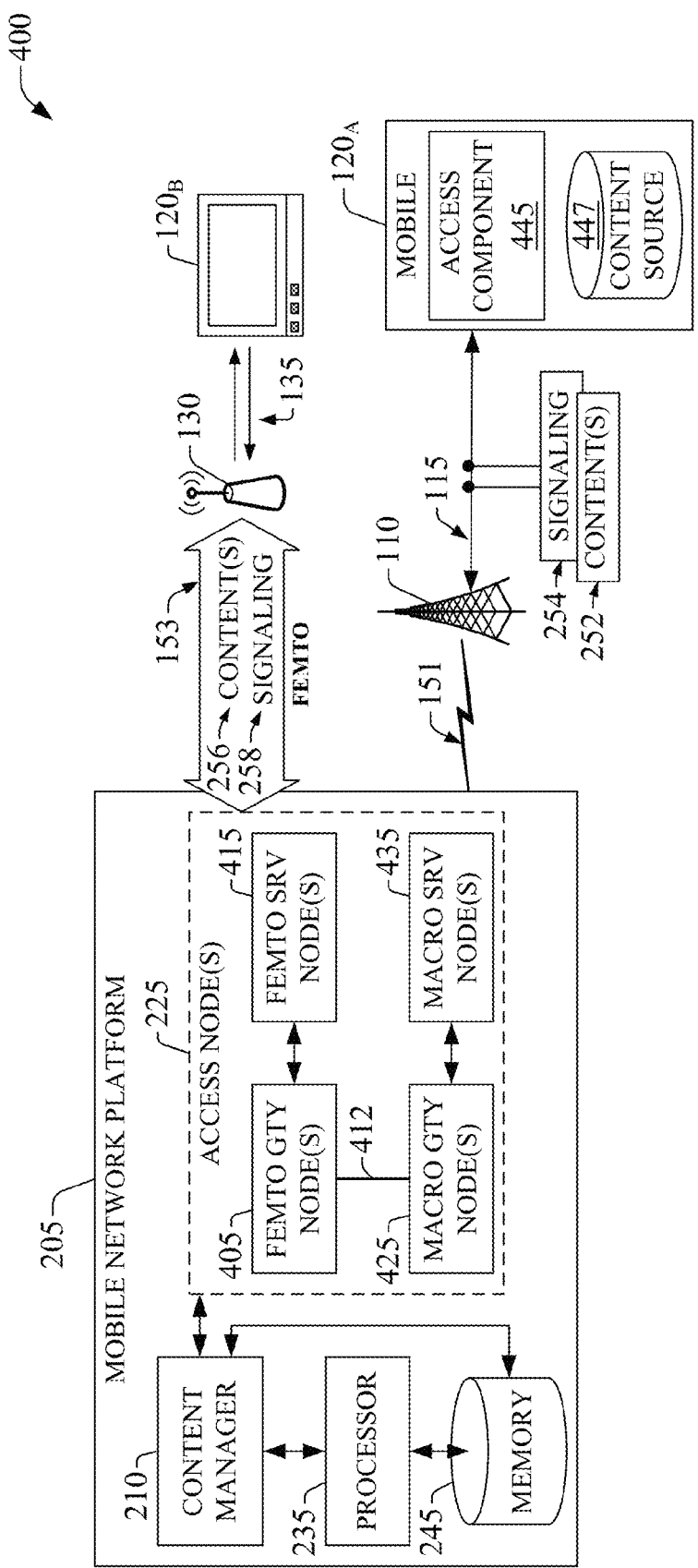
FIG. 4 is a block diagram of an example system that facilitates management of content(s) directed to a WDMF through a mobile station, the management is supported at least in part by a mobile network platform in accordance with aspects described herein.

FIG. 4 is a block diagram of an example system 400 that facilitates management of content(s) directed to a WDMF via a mobile station, the management is supported at least in part by a mobile network platform. It is noted that in example system 400, components and elements with like numerals as in previously discussed embodiments or example systems possess almost the same or the same functionality and operate in substantially the same or the same manner as previously described. In example system 400, a mobile station $120_A$ delivers content(s) 252 and signaling 254 via macro coverage through a wireless link 115 served through base station 110 and backhaul link(s) 151. Mobile station 120A can be associated with a primary subscriber $250_1$, a secondary subscriber $250_2$, or a K-ary subscriber $250_K$. In an aspect, content(s), e.g., multimedia files, or content(s), can originate from mobile 120$_A$ (e.g., a picture taken with the mobile's camera) and are conveyed to mobile network platform 205 for transmission to WDMF 120$_B$. Multimedia content(s) are retained in a content source 447, which can be part of a memory element that is internal (as illustrated) or external to mobile 120$_A$. Mobile station 120$_A$ can transmit SMS communication(s) (e.g., text), MMS communication(s) such as picture(s) or video(s), with or without sound, to WDMF 120$_B$ through utilization of a credential associated with the WDMF wherein the credential can be a mobile directory number (MDN).

Mobile network platform 205 receives content(s) 252 or signaling 254 intended to WDMF 120$_B$ and exploits in part a femto network platform and radio access network for delivery. In an aspect, macro serving (SRV) node(s) 435 receive a data stream that carries at least in part content(s) 252 or signaling 254, and relays the data stream to macro gateway (GTY) node(s) 425, which in turn relays the data stream to content manager 210 for manipulation as described hereinbefore in connection with example system 200. Alternatively, data stream associated with content(s) 252 or signaling 254 can be routed through reference link 412 (e.g., Gn in EDGE or 3GPP UMTS) from macro gateway node(s) 425 to femto gateway node(s) which can relay the data stream to content manager 210. Once signaling 254 or manipulated content(s) 252 (e.g., reformatted, compressed) and scheduled by content manager 200 to be delivered to WDMF 120$_B$, content(s) 252 are received at femto gateway nodes(s) 405 and transmitted to femto serving node(s) 415 which delivers such content(s) as part of content(s) 256 to femto AP 130 via backhaul link(s) 153 for transmission to WDMF 120$_B$ through wireless link 135. It should be appreciated that content(s) 256 can include voice or other data traffic transmitted from WDMF 120$_B$ in response to received content(s) 252. As an example, end user of WDMF 120B can acknowledge received content(s) 252 by reaching to the subscriber (e.g., secondary subscriber 250$_2$ via a push-to-talk capability available to WDMF 120$_B$. As another example, end user of WDMF 120$_B$ can enter a message by writing, with a stylus, on a display area of WDMF 120 to respond (e.g., thank) to a sender in view of received content(s); it should be appreciated that WDMF 120$_B$ can employ handwriting recognition to digitize the message entered with the stylus, and deliver it as part of content(s) 256.

In an aspect, access component 445 interfaces a subscriber with a source of content(s), such as memory element(s) in mobile 120$_A$ that retains multimedia content(s), and content(s) extant in WDMF 120B and access credential (e.g., a MDN) of WDMF 120$_B$. In addition, access component 445 can interface the subscriber with a data entry interface (e.g., key pad, touch screen) in mobile 120$_A$ that allows to enter commands directed to WDMF 120$_B$; e.g., a command to delete extant content(s) in WDMF 120$_B$. It is to be noted that deletion of a content(s) in WDMF 120$_B$ can be soft, wherein a content is removed from the WDMF 120$_B$ and retained in content(s) storage 247, or hard in which case the content(s) are removed from WDMF 120$_B$ and content(s) storage 247. It is noted that the various commands can be directed to WDMF 120$_B$. Such commands are primarily determined by a set of commands that WDMF 120$_B$ can execute. An example set of commands can include the following:

receive image
save image
display image
play audio
save image
save audio
delete image
delete audio
receive mms
receive sms
receive mbms
receive emergency broadcast message
report memory available
clear memory
command acknowledgment
status
place voice call
receive voice call It is to be appreciated that a WDMF can execute other commands and a universe of commands is determined by all commands that a WDMF is configured to execute. In an aspect, commands include directives to control or monitor a WDMF (e.g., WDMF 120$_B$). As an illustrative example, a son (e.g., a primary subscriber 250$_1$, or system subscriber) who has bought a WDMF for his mother (e.g., an end user) can convey one or more commands—as discussed above, or in connection with example system 500 below—to remotely control the portable wireless enabled media frame, such that the mother can view media files without directly operating the WDMF besides maintaining the WDMF on. In one aspect, the son can select a subset of commands that can be performed locally by the mother. For example, the mother can be allowed to enter a command through almost any, or any, input device connected to the portable wireless enabled media frame, for example, to delete pictures, display her favorite pictures more often, etc.

Figure 5:
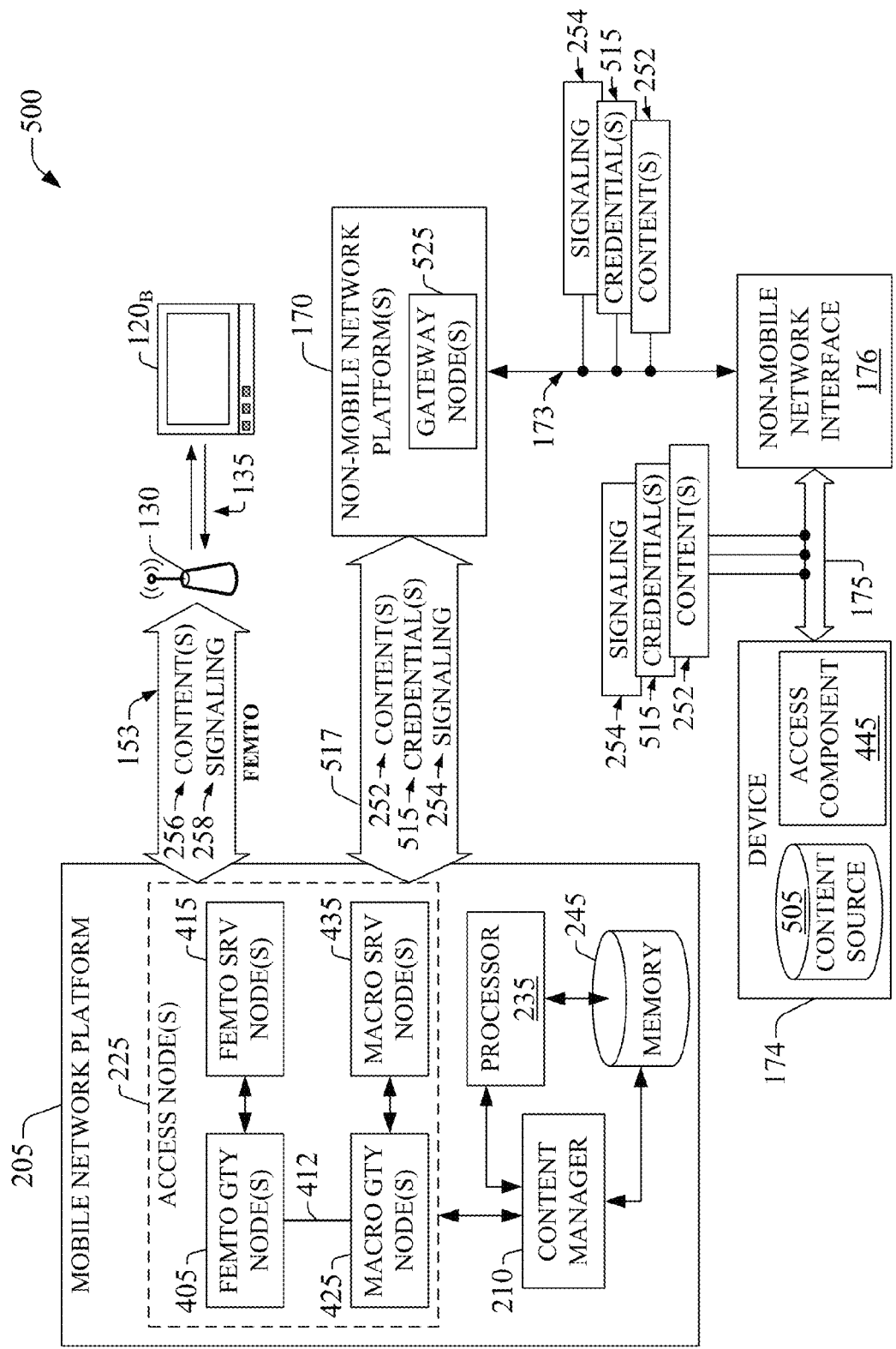
FIG. 5 is a block diagram of an example system that that facilitates management of content(s) directed to a WDMF through a networked device, the management is supported at least in part by a mobile network platform in accordance with aspects described herein.

FIG. 5 is a block diagram of an example system 500 that facilitates management of content(s) directed to a WDMF through a networked device, the management is supported at least in part by a mobile network platform. It is noted that in example system 500, components and elements with like numerals as in previously discussed embodiments or example systems possess almost the same or the same functionality and operate in substantially the same or the same manner as previously described. In example system 500, multimedia content(s) 252 and signaling 254 originate from device 174 and are conveyed to mobile network platform 205 for transmission to WDMF 120$_B$. Multimedia content(s) are retained in a content source 505, which can be part of a memory element that is internal or external to device 174. In an aspect, device 174 can be associated with a primary subscriber 250$_1$, a secondary subscriber 250$_2$, or a K-ary subscriber 250$_K$. Device 174 can include wireless or tethered devices with wireless capabilities, which can be located in disparate locations within a coverage area (e.g., area 172). Device 174 typically has electronic components or photonic components, which include operational optic elements, and a set of one or more specific enabled or capable functionalities (e.g., communication-oriented, control-oriented, image and sound display-oriented, computation-oriented, storage oriented . . . ), and operational resources (e.g., display size and type, computing power associated with a processor like a computing processing unit or graphic processing unit that resides within the device; memory structure and type (e.g., hard-drive aspects) determined at least in part by a memory present in the device; access to peripherals; and so on. It should be appreciated that a single device 174 can combine various functionalities. In an aspect, a device implements its one or more functionalities through a set of components to which a processor, assisted through memory element(s), confers at least part of their functionalities. Illustrative examples of devices are tethered devices like a personal computer (PC), a digital picture or video camera, a printer, a gaming console either wired or wirelessly connected through link component 175 to network interface 176 and to non-mobile network platform(s) 170 there from, etc. Moreover, depending on non-mobile network platform(s) 170, device 174 can be a health performance indicator monitor like an ultrasound, echography, or radiology equipment; infant incubator monitoring equipment; and so on. It should be appreciated that a primary subscriber can configure an infant incubator monitoring equipment to deliver images of his or her baby to a determined WDMF. It should further be appreciated health care equipment can facilitate interaction among a physician and a substantially home-bound patient that receives and discussed results of health assessment through features of a WDMF.

In example system 500, to deliver content(s) 252 or signaling 254, a subscriber (e.g., primary subscriber $250_1$) who operates device 174 logs in a related subscriber account 327 and access content(s) associated with a set of subscribed WDMFs, which the subscriber can manage. Access component 445 facilitates login in the subscriber account. To at least that end, device 174 conveys credential(s) 515 which are received in non-mobile network platform(s) and relayed to mobile network platform 205 by gateway node(s) 525. In an aspect, credential(s) 515 are generated by subscription component 212 at a time a subscription to content manager 210 issues. Content manager 210, via integrity component 214 validates credential(s) 515 and signals to device 174, via signaling 254 that access to content(s) management is granted; an indication that access is granted can be embodied in a set of reserved bits in a control channel frame or packet header, two or more bits in the set of reserved bits can be arranged in specific combinations to convey access privileges associated with the subscriber to whom access has been granted. Signaling 254 among mobile network platform 205 and non-mobile network platform(s) 170 can be exchanged via reference link 517—e.g., a Gn or link when non-mobile network platform is operated as a part of a service provider network that includes mobile network platform 205, or Gi link when non-mobile network platform is external to mobile network platform 205.

Once access component 445 receives the indication that access to content management service is granted, access component 445 can facilitate upload of content(s) 252 or communication of signaling 254 to WDMF $120_B$. Content(s) 252 or signaling 254 are delivered to non-mobile network interface 176 and relayed to gateway node(s) 525 in non-mobile network platform(s) 170, which relays content(s) 252 or signaling 254 to mobile network platform 205. As discussed above, access node(s) 255 receives content(s) 252 or signaling 254 and transmits it to content manager component 210, which processes the content(s) 252 or signaling 254 and conveys it to WDMF $120_B$ through backhaul link(s) 153 to femto AP 130 and via wireless link 135 there from.

Additionally, access component 445 interfaces a subscriber with a source of content(s), such as memory element(s) in device 174 that retains multimedia content(s),), and content(s) extant in WDMF $120_B$ and access credential (e.g., a MDN) of WDMF 120B. In addition, access component 445 can interface a subscriber with a data entry interface in device 174 that allows to enter commands directed to WDMF $120_B$; e.g., a command to delete extant content(s) in WDMF $120_B$. As an example, device 174 can be ultrasound equipment that is connected to a non-mobile hospital network, which is an embodiment of non-mobile network platform 170. After data associated with fetus development of a primary subscriber undergoing a routine prenatal exam, the subscriber can login via access component 445 to content management service and select, through access component 445, one or more shots of the fetus to be conveyed to a WDMF (e.g., WDMF $120_B$) hosted and operated in the residence of the subscriber parent(s). As another example, device 174 can be digital camera that is connected to via a USB cable connection (e.g., an embodiment of link component 175) to a router (e.g., an embodiment of non-mobile network interface 176) that accesses a DSL internet provider (e.g., an embodiment of non-mobile network platform(s)), the digital camera is operated by a secondary subscriber who can login to content management service through the digital camera and transmit pictures to a WDMF hosted in the secondary subscriber's grandparent(s); access component 445 can be embodied in a thin client within the digital camera.

Figure 6:
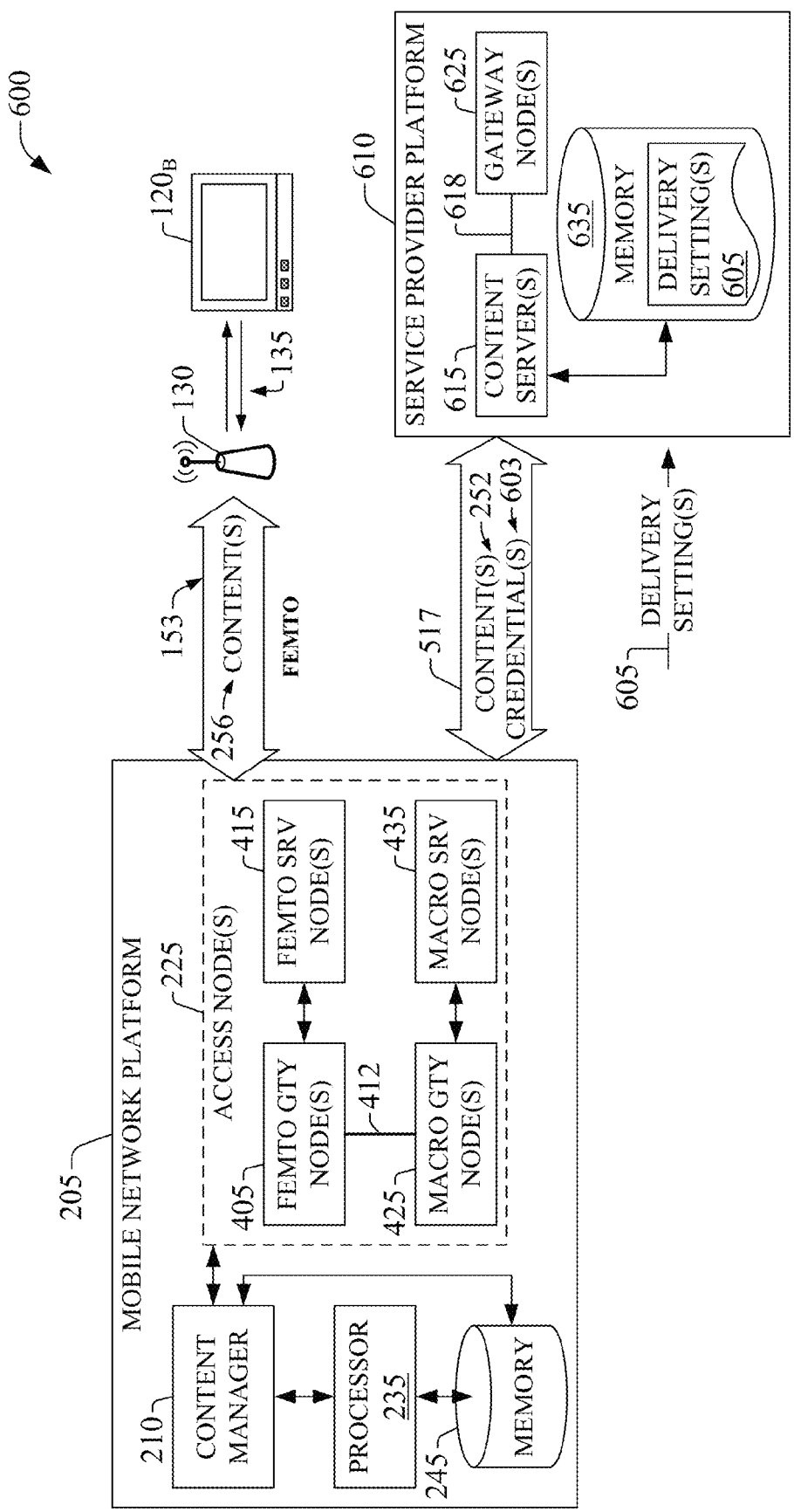
FIG. 6 is a block diagram of an example system that facilitates management of content(s) directed to a WDMF through a service provider platform designated by a primary subscriber in accordance with aspects described herein.

FIG. 6 is a block diagram of an example system 600 that facilitates management of multimedia content(s) directed to a WDMF through a service provider platform designated by a primary subscriber. It is noted that in example system 600, components and elements with like numerals as in previously discussed embodiments or example systems possess the same functionality and operate in the same manner as previously described. Service provider platform 610 originates multimedia content(s) 252 which are conveyed to mobile network platform 205 for transmission to WDMF $120_B$ through femto AP 130. Content(s) 252 delivery can be automatic and preconfigured, and the content(s) 252 are retained within content(s) storage 247 and associated with a primary subscriber $250_1$ that designates content server(s) 615 to convey content(s) to a subscriber account(s) 337 associated with the primary subscriber $250_1$ for delivery to WDMF $120_B$. In an aspect, a primary subscriber $250_1$ can designate content server(s) 615 at a time of subscription to content management service, or almost any time subsequent to subscription issuance. Such designation can be recorded within subscriber account(s) 327, a recordation indication can be embodied in a predetermined multi-bit word in a specific memory register, or a recordation system file (not shown) retained policy storage 325. Examples of content server(s) 615 that can be configured include, but are not limited to: a predetermined webpage in almost any networking and exchange content server(s) such as for example a www.myspace.com, www.facebook.com, or www.flickr.com webpage associated with the primary subscriber $250_1$, or a K-ary subscriber 250K designated by the primary subscriber, that subscribed a WDMF $120_B$; free "brain games" content server(s) like Sudoku puzzles web sites like www.websudoku.com; or news websites.

In addition, primary subscriber $250_1$ can configure a delivery pattern through delivery setting(s) 605 at the time of subscription issuance or thereafter. The delivery setting(s) 605 can include criteria for delivering or pushing specific content when it is updated, or when new content of a specific type (e.g., news, short literary works such as poems, travel pictures and movie clips, season pictures like autumn colors, challenges or solutions or portion of solutions to crosswords or other type of "brain games" like Sudoku . . . ) is generated or uploaded in content server(s) 615. It should be appreciated that when content(s) 252 in content server(s) 615 is protected through license terms, content(s) are disseminated in accordance to a license agreement (e.g., license-free content, GNU General Public License, trial-term license, multi-user license, single-device license, copyrighted content, and so forth) among a primary subscriber that configures delivery setting(s) 605. It should further be appreciated that in contrast to conventional web-based feeds, content(s) 252 are conveyed to WDMF 120B according to delivery setting(s) 605 configured by a primary subscriber $250_1$, rather than conveyed to disparate content server(s) in disparate service platform(s).

Additionally, service provider platform 610 can be operated by an entity that operates mobile network platform 205. In an aspect, service provider platform 610 can be an internet protocol multimedia subsystem (IMS) or an internet service provider. Alternatively, service provider platform 610 can be operated by a disparate entity. In an aspect, integrity of content(s) 252 is maintained through integrity component 214, which can determine whether originating service provider platform 610 is allowed to deliver content(s) directed to WDMF $120_B$. Integrity component 214 can utilize a look-up table (not shown) of authorized service provider platforms to validate a logic address (e.g., IP address) of content(s) server 615. It should be appreciated that other validation mechanisms can be employed such as conventional encryption-key challenge(s) (e.g., Challenge Handshake Authentication Protocol (CHAP)) posed to content server(s) 615, or via issuance of digital certificate(s) for content server(s) once a subscriber designates a service provider platform. In the latter scenario, in an aspect of the subject innovation, security component 305 can act as a certificate authority, which can generate and receive certificates (e.g., credential(s) 603) associated with designated content server(s) 615, and verify the certificates (e.g., electronic credentials such as codes, labels, tokens, lightweight files, encrypted or otherwise).

In example system 600, service provider platform 610 includes content server(s) 615 functionally coupled to gateway node(s) 625 through a reference link 618. Gateway node(s) 625 receives delivery setting(s) 605, and delivers content(s) 252, extant or generated in content server 615, via reference link 517. Delivery setting(s) 605 are retained in memory 635. In addition, gateway node(s) 625 also delivers credential(s) 603. Content(s) 252 or credential(s) 603 are received by macro serving node(s) 435 and routed to content manager 210 in substantially the same manner as discussed above in connection with example system 400 or 500.

Figure 7:
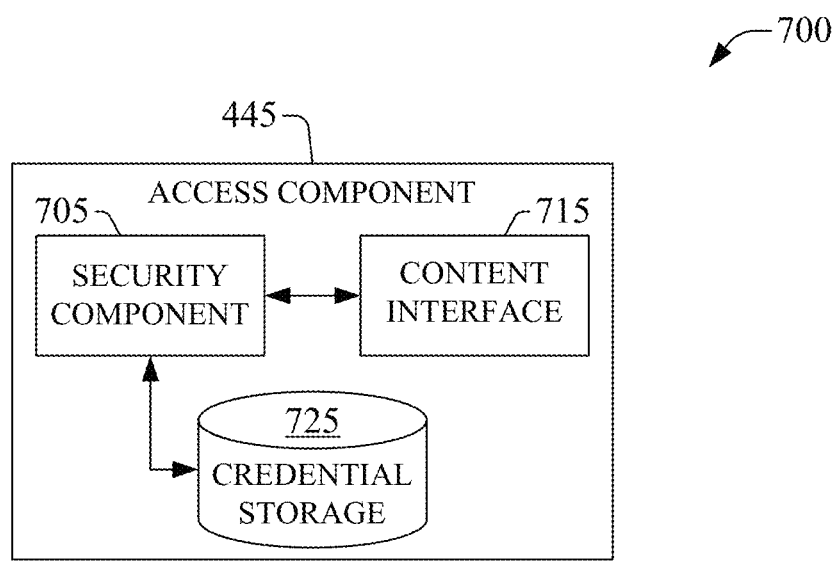
FIG. 7 is a block diagram of an example embodiment of an access component that facilitates login to a service for management of content(s) directed to a WDMF, service provided at least in part through a mobile network platform.

FIG. 7 is a block diagram of an example embodiment 700 of access component 445 that facilitates login to a service for management of content(s) directed to a WDMF, service provided at least in part through a mobile network platform. In example embodiment 700, security component 305 facilitates login into a subscriber account 337, and possess the same. In an aspect, subscription component 212 can provide a web-based portal that validates credential(s) of a subscriber and associated devices(s) utilized to convey content(s) (e.g., content(s) 252) and signaling (signaling 254), credential(s) are submitted through security component 305 and can be retained in credential storage 725. Validation is conducted in accordance with one or more security protocols. As an example, a set of security protocols can include, but is not limited to including, Internet Protocol Security (IPsec), Secure Socket Layer (SSL), Transport Layer Security (TLS), Secure Shell (SSH), Secure File Transport Protocol (SFTP), Secure Copy (SCP), and so forth. It is to be noted that security component 705 can exploit one or more of the illustrative security protocols to establish a virtual private network (VPN) for device-to-WDMF or platform-to-WDMF tunnel of content(s) (e.g., content(s) 252) and signaling (e.g., signaling 254) associated with content(s) management aspects described in the subject specification.

Additionally, access component 445 can exploit content interface 715 to render content(s) that resides in a WDMF associated with a subscriber (e.g., a K-ary subscriber $250_K$) that has logged into content management service. In addition, content interface 715 can expose multimedia content(s) that reside in a mobile device (e.g., UE $120_A$) or non-mobile device (e.g., device 174) and can be conveyed to a WDMF (e.g., WDMF $120_B$). A processor (not shown) can provide at least in part the functionality of access component 445 and components that reside thereon.

Figure 8:
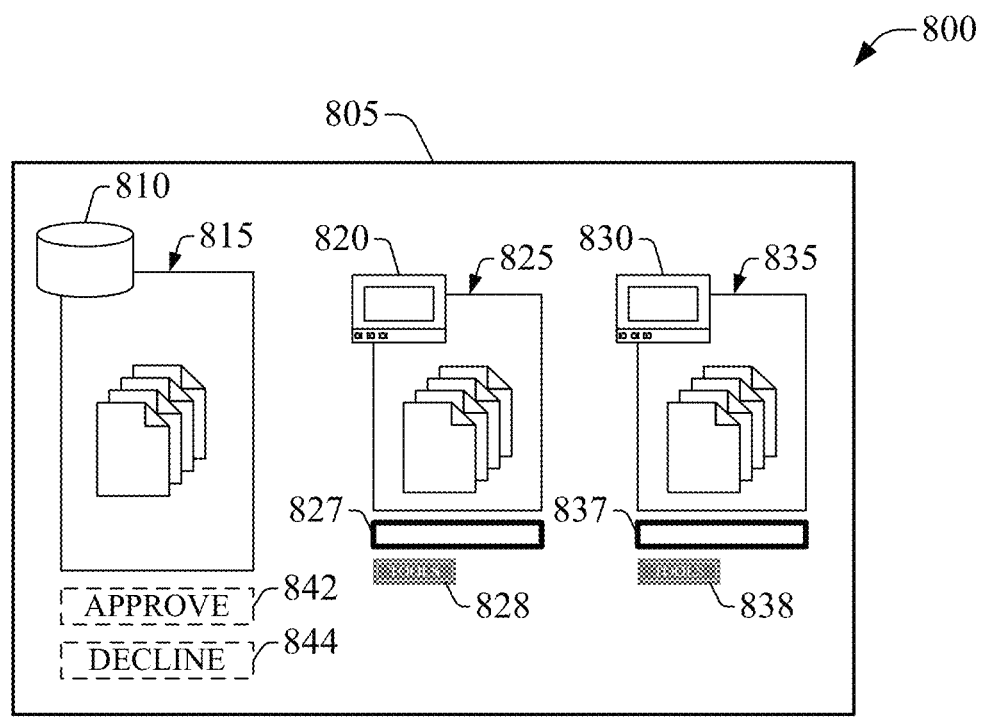
FIG. 8 is a diagram of an example rendering area of a display interface in a mobile or non-mobile device that illustrates an example rendition of contents available to be transmitted to a WDMF and contents stored thereon in accordance with aspects described in the subject specification.

FIG. 8 is a diagram 800 of an example rendering area 805 of a display interface in a mobile or non-mobile device that illustrates an example rendition of content(s) available to be transmitted to a WDMF and content(s) stored thereon. In an aspect, content interface 715 can format content(s) as illustrated for display to a subscriber (e.g., a primary subscriber 250) as illustrated in diagram 800. Display 805 is a part of a display interface component that can reside in a mobile device (e.g., UE 120A) or a non-mobile device (e.g., device 174). Aspects or features of a display interface component, and a display 805, are generally dictated by operational resources available to such display interface component. For example, a display interface component can be embodied in a display area in a monitor (e.g., a cathode ray tube (CRT) monitor, a Liquid Crystal Display (LCD) monitor, a plasma monitor, an electrochromic monitor, and so on) that renders images from a personal computer, a digital video camera, echography equipment, etc. In example rendering area 805, icon 810 represents a source of content associated with a device employed to manage content(s) directed to one or more WDMF. Actuation of icon 810 can lead to display of rendering area 815 that presents multimedia content(s) and facilitate navigation thereof. In an aspect, icon 810 actuated through various navigation gestures, such as one or more of mouse or joystick clicks, a tap in case display interface provides a touch screen, a hover of an object such as a subscriber hand, a voice command, and so on.

Icons 820 and 830 represent WDMFs linked to source of content 810 and related subscriber (e.g., primary subscriber $250_1$); each of the icons 820 and 830 is displayed in conjunction with credentials 827 and 837 that can be employed to contact respective WDMFs. When icon 820 or 830 is actuated in substantially the same manner as icon 810 (e.g., through one or more of mouse or joystick clicks, a tap in case display interface provides a touch screen, a hover of an object such as a subscriber hand, a voice command) content extant in the WDMF related to the actuated icon is rendered: Rendering area 825 displays content items extant in WDMF 820, and rendering area 835 displays content items in WDMF 830. Such content can be displayed in accordance with various schemes like windows-based scheme with iconic representation in which each content item is presented as an icon; pop-up representation wherein each content item or groups of content items can be displayed as a pop-up window of suitable size; or a text-based representation, with scroll-down or scroll-sideways delivery, or static rendering, in which content items are listed in accordance to an item name. It should be appreciated that the number of WDMFs that is presented as icons reflects the number of WDMFs that are actually subscribed to the subscriber that operates the device associated with content source 810. In an aspect, when conditions of radio link 135 are in failure, e.g., conditions are insufficient to deliver content(s), the icon associated with the WDMF can be presented in conjunction with indicia that conveys the WDMF is unavailable to receive content(s).

Content displayed in areas 815, 825 and 835 can be accessed and manipulated through various gestures such as click, drag-and-drop, touch or tap, hover of an object such as a subscriber hand, voice command(s), etc. In an aspect, hovering over the content(s) can result in a preview thereof. In addition, actuating icons 828 and 838 can display a set of instructions supported in respective WDMFs. A primary subscriber (e.g., subscriber $250_1$) can observe content(s) accessed and manipulated by secondary, tertiary . . . K-ary subscribers; however, based upon delivery privileges, primary subscriber can be prompted for approval (e.g., via a icon 842) or rejection (e.g., through an icon 844) of attempted manipulation of content(s) by K-ary subscribers. When a subscriber that is not a primary subscriber is approved or declined to conduct a content manipulation, indicators 842 or 844 can be displayed to the subscriber. Content(s) can be manipulated (e.g., transferred from content(s) source 810, deleted from a WDMF) via gestures such as drag-and-drop, voice command, or the like. In another aspect, content(s) from a first WDMF, e.g., WDMF 820, can be transferred to a second WDMF, e.g., WDMF 820, in substantially the same manner as content(s) are uploaded from content(s) source 810 to a WDMF. It is to be noted that gestures that facilitate content(s) manipulation and management translated into suitable signaling that is conveyed to content manager component 210 through signaling 254.

It should be appreciated that specific format of rendered content(s) available to be managed, and associated gestures to effect management can depend at least in part upon display resources available a device (e.g., UE $120_A$) that originates content(s) directed to a WDMF (e.g., WDMF $120_B$).

Figure 9:
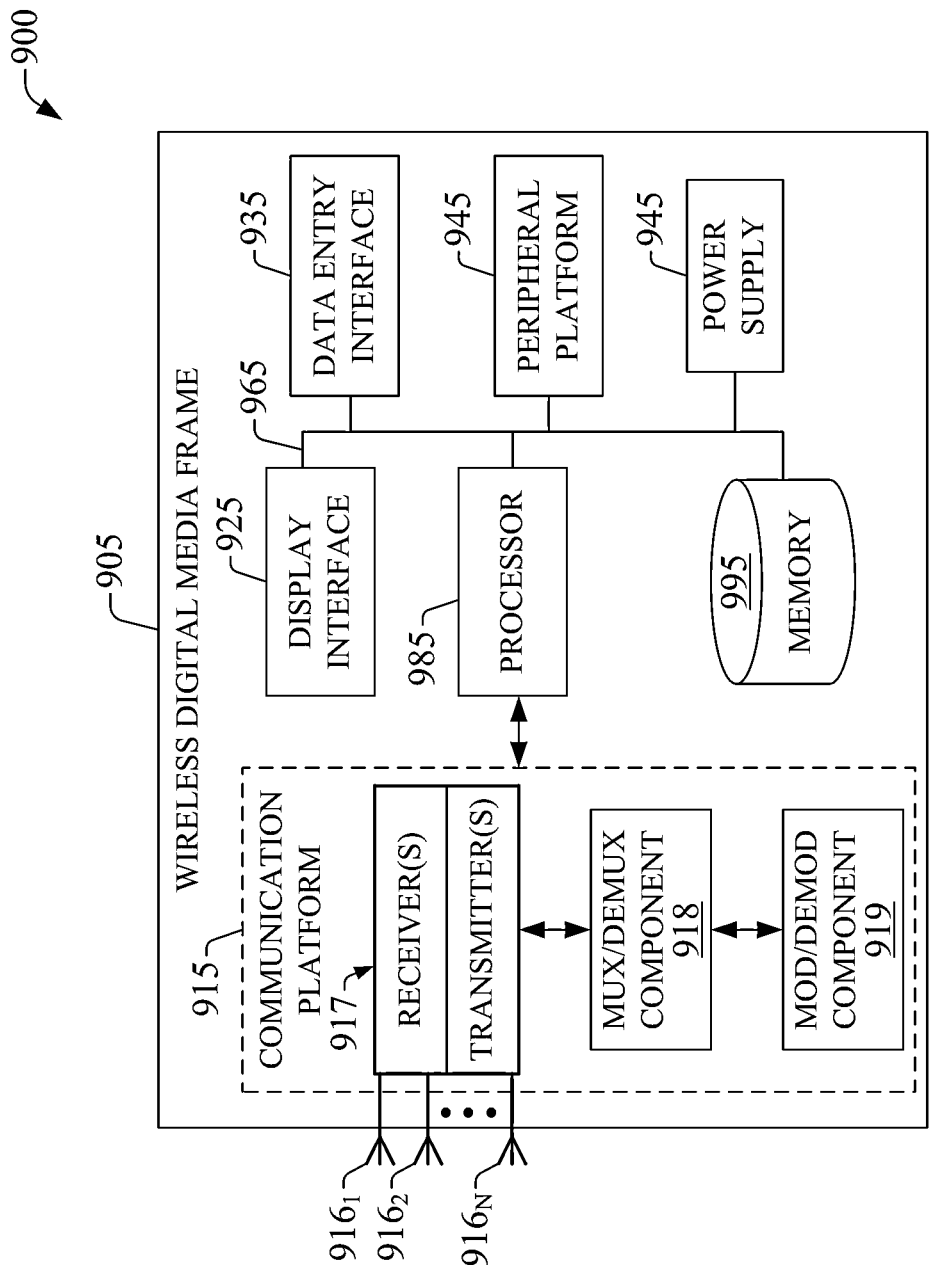
FIG. 9 illustrates a block diagram of an example embodiment of a wireless digital media frame that can implement features and aspects described herein and operate in accordance with such features and aspects.

FIG. 9 illustrates a block diagram of an example embodiment 900 of a wireless digital media frame 905 that can implement features and aspects described herein and operate in accordance with such features and aspects. In example embodiment 900, to effect wireless communication, WDMF 905 includes a set of antennas $916_1$-$916_K$ (K is a positive integer) which can receive and transmit signal(s) from and to at least one of an access point (e.g., femto AP 130) that provide wireless coverage in the area that hosts the WDMF 905, a wireless port or routers, or the like. Antennas $916_1$-$916_K$ are a part of communication platform 915, which comprises electronic components and associated circuitry that provide for processing and manipulation of received signal(s) and signal(s) to be transmitted. In an aspect, communication platform 915 can be embodied in a modem. It is to be noted that while communication platform 915 is illustrated as internal to WDMF 905, one or more alternative embodies can include communication platform 915 as an external element of WDMF 905. In an aspect, communication platform 915 includes receiver(s)/transmitter(s) 916 that can convert signal from analog to digital upon reception, and from digital to analog upon transmission. In addition, receiver/transmitter 916 can divide a single data stream into multiple, parallel data streams, or perform the reciprocal operation; such operations typically conducted as a part of various multiplexing schemes dictated by telecommunication standard protocols for various of the technologies (2.5G, 3G, and 4G) that can be exploited by WDMF 905. Functionally coupled to receiver(s)/transmitter(s) 917 is a multiplexer/demultiplexer (mux/demux) component 918 that facilitates manipulation of signal(s) in time and frequency space according to specific standard protocols indicated supra. A mux/demux component 918 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 918 can scramble and spread data and control information according to substantially any code; e.g., Hadamard-Walsh codes, Baker codes, Kasami codes, polyphase codes, and so on. A modulator/demodulator (mod/demod) component 919 is also a part of communication platform 1325, and can modulate data and control information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. Electronic mod/demod component 919 is functionally coupled to mux/demux component 918.

Operation of communication platform 915, and components associated thereto, can be dictated by a specific mode of wireless communication exploited by WDMF 905. A processor 985 can determine and schedule the various disparate modes of operation. As an example, processor 985 can schedule communication platform 915 to receive terrestrial traffic and signaling and satellite traffic and control. Moreover, processor 985 enables, at least in part, communication platform 915 to process data (e.g., symbols, bits, or chips) for multiplexing/demultiplexing, modulation/demodulation, such as implementing direct and inverse fast Fourier transforms, selection of modulation rates. Furthermore, processor 985 can facilitate construction of pilot signal(s) that can be employed for assessment of radio link conditions within the environment WDMF 905 operates. Further yet, processor 985 can implement attachment protocols that allow WDMF 905 to camp within a femto AP for wireless coverage in accordance with aspects described herein.

In example embodiment 900, WDMF 905 includes a display interface 925 which can render multimedia content(s) available to WDMF 905; e.g., content(s) 256 received via femto cell AP 130, or locally uploaded content(s). Available content(s) include video clips, sound clips, image files, text-based files, and trade-specific files such as echography pictures, radiology images, etc. Display interface 925 can render content(s) via visual or aural indicia. Available content(s) can be rendered in accordance with various schemes (e.g., windows-based schemes such as iconic representation, pop-up representation; or text-based representation, with scroll-down or scroll-sideways delivery, or static rendering), and organized in various configurations within a display screen that is part of display interface 925. In addition, display interface can display indicia that facilitates controlling operation of WDMF 905, or reveal aspects of the functionality or operation thereof (e.g., indicator(s) that convey wireless signal strength) of non-mobile devices registered with a mobile network and available for content transaction(s)). In an aspect, display interface 925 can be a liquid crystal display (LCD), a plasma panel, a monolithic thin-film based electrochromic display, and so on. A display screen has substantially larger real estate than a display screen in the mobile station, and substantially less real estate than a monitor of a desktop computer or flat-panel television set.

Additionally, WDMF 905 includes a data entry interface 935 that facilitates interaction with an end-user, who can enter command(s) or directive(s) to consume, or display, multimedia content(s) available to the WDMF 905. As an example, end-user can enter command(s) to delete content(s), as discussed above, the deletion can be soft or hard; or to adjust a schedule that controls a rate at which favorite content(s) (e.g., a picture(s) of a grandson deployed in a war zone, or a newborn son or granddaughter, a poem, picture(s) of college graduation of the end-user children . . . ) are displayed. As another example, an end user can aggregate content(s) via data entry interface 935; e.g., annotate rendered graphic content(s) or add audio content(s), in addition to edit content(s) available to WDMF 905. In addition, data entry interface 935 can facilitate placing alarm(s), such as a distress call to subscriber(s) associated with the WDMF 905; in such scenario, WDMF 905 exploits processor 985 to convey alarm(s) signaling and content(s) through femto AP 130 and backhaul link(s) 153 as discussed above. In an aspect, end user can interact with WDMF 905, and provide signaling to be effected locally or transmitted to a content management service or a subscriber (e.g., signaling 258), through various instruments such as a keypad, touch screen, microphone, camera(s) . . . ) for data input. It is noted, in one aspect, that a primary subscriber can determine, at a time of subscription or thereafter, a set of commands that an end user can perform locally in order to ensure content(s) and operation integrity. An indication of the subset of allowed commands can be received by WDMF 905 via signaling from a content manager component that effects content management service.

Wireless digital media frame 905 also can include a peripheral component 945 which can be connected to, or facilitate connection to, additional devices such as printer(s), media player(s), wireless router(s) (e.g., non-mobile network interface 176), biometrics touch-pad(s), etc. In an aspect, to afford such connectivity, peripheral platform 945 can include jacks for one or more of Ethernet, USB, GPIB, RS-232, FireWire, optical or coaxial cable connectors. Peripheral platform 945 facilitates to upload multimedia content(s) locally.

In example embodiment 900, power supply 945 can power-up device wireless digital media frame and substantially any, or any, component included thereon through system bus 965. Power supply 945 can be a rechargeable solar-based (e.g., through solar cells) or chemical-based (e.g., lithium-based) battery. It should be appreciated that alternative or additional embodiments of WDMF 905 may not include power supply 945 and be powered via an attachment to a conventional power grid. Moreover, yet additional or alternative embodiments can rely on a hybrid approach with power drawn from a battery and a power grid.

Additionally, system bus 965 can be employed to functionally and mutually connect most any components or elements in WDMF 905 as presented herein regarding embodiment 900, the components or elements include, but not limited to, display interface 925, data entry interface 935, peripheral platform 945, and power supply 945, or memory 995. System bus 965 can be any of several types of bus structure that may further interconnect to a memory bus (with or without a memory controller), a peripheral bus, and a local bus using any of a variety of conventional bus architectures.

In embodiment 900, WDMF 905 also includes a processor 985 configured to confer functionality, at least in part, in accordance with aspects of the subject innovation to substantially any electronic component within WDMF 905. In an aspect, processor 985 is functionally coupled, through system bus 965 to memory 995 in order to store and retrieve or execute information necessary to operate or confer functionality, at least in part, to communication platform 915, display interface 925, and data entry interface 935, and other operational features of WDMF 905.

Memory 995 can be embodied at least in part in a UICC card or SIM card, which contains SIM and USIM applications with associated credentials that can facilitate wireless communication of WDMF 905. Memory 995 also can retain multimedia content(s) which WDMF 905 can consume. Additionally, memory 995 can store data structures (e.g., metadata); code structure(s) (e.g., modules, objects, classes, procedures) or instructions related to protocols, applications, and utilities (e.g., an operating system either proprietary or commercially available) that facilitate operation of WDMF 905 as described herein. It should be appreciated that while memory 995 is illustrated as internal to WDMF 905, it can be embodied at least in part in external removable memory elements connected to WDMF 905 through peripheral platform 945.

Figure 10:
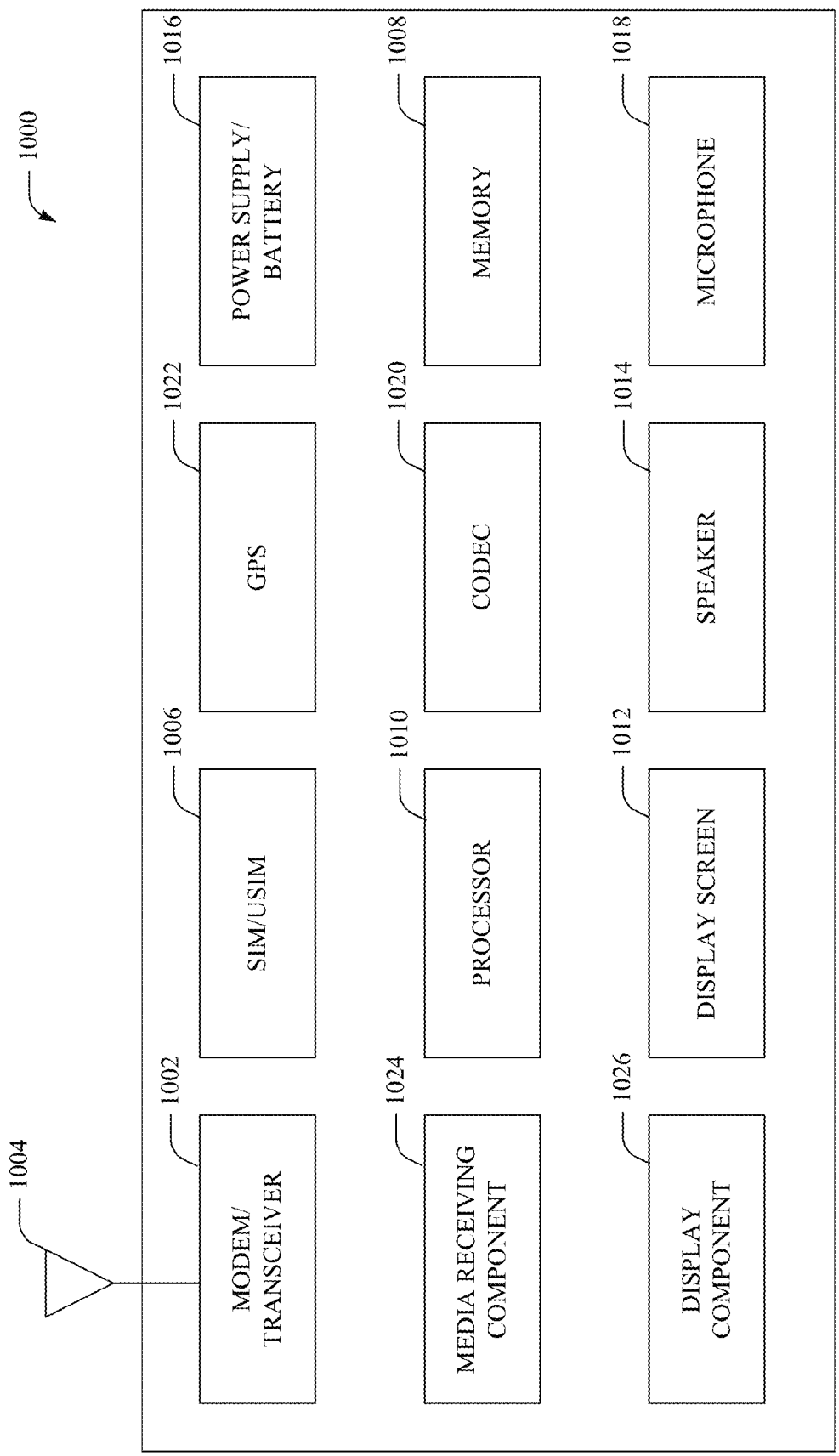
FIG. 10 illustrates an additional or alternative example embodiment of a wireless digital media frame system that can implement features and aspects described herein and operated in accordance with such features and aspects.

FIG. 10 illustrates an additional or alternative example embodiment of a wireless digital media frame system that can implement features and aspects described herein and operated in accordance with such features and aspects. The example embodiment 1000 of a WDMF can include a modem 1002 that can wirelessly communicate with a wide area network, for example, employing a 2G/3G/3.5G/4G wireless connection. As an example, the modem 1002 can be a wireless wide area network (WWAN) modem/transceiver such as a GPRS/EDGE/CDMA/UMTS/HSPA/LTE modem that can transfer digital images (or other media files) and/or control data to the example embodiment 1000 of a WDMF using a 2G/3G/3.5G/4G or other wireless connection. Moreover, the modem 1002 can operate in any of the commonly used wireless spectrum bands. As an example, the modem 1002 can be IPv6 (Internet Protocol version 6) enabled. It can be appreciated that the modem 1002 can be embedded in the system 1000 or external to the example embodiment of a WDMF 1000 and can be connected to an antenna 1004 to receive and/or transmit data. The antenna 1004 can be external or internal. Moreover, the modem 1002 can receive instructions sent by a remote user (e.g. system subscriber) over a femto network, e.g, a mobile network platform that serves a network of deployed femto access points, to change one or more settings and/or perform one or more functions on the example embodiment 1000 of a WDMF, for example, load, delete or play a file. Furthermore, the modem 1002 can also be configured to receive wireless emergency alerts (SMS, Image)/broadcast from a mobile network platform. Additionally, the example embodiment 1000 of a WDMF can include a SIM (Subscriber Identity Module) or USIM (Universal Subscriber Identity Module) 1006 associated with the system users account subscription. The SIM or USIM 1006 can be prepaid, flat rate monthly, or usage based. Further, the SIM or USIM 1006 may need to be a locked to the specific type of device (e.g., a wireless digital media frame that employs a WWAN modem) to prevent it from being used in a mobile phone or wireless data device to prevent network abuse if lower rates, including flat rate, are offered to the system subscribers.

The media receiving component 1024 can receive media files, e.g, content(s) 256, sent to the example embodiment 1000 of a WDMF through a femto access point via the modem 1002. Received media files can be displayed through display component 1026. The modem 1002 can include control functions to enable communication with the WWAN and transfer of data in the downlink. The modem 1002 can be downlink enabled and can optionally allow the ability to transfer data in the uplink (UL) direction beyond control channels. For example, the example embodiment 1000 of a WDMF can transfer data associated with available free space in memory 1008 to a mobile network platform in the UL. Further, the modem 1002 can be configured to allow network control such that transfer of data (scheduling) could occur at various times of the day based on network/sector loading due to traffic and propagation conditions and/or based on user preferences. Further, the modem 1002 can be configured to work on a prepaid condition or active account or unlimited usage account.

The example embodiment 1000 of a WDMF can typically include a processor 1010 that can be a processor based controller chip to control the WDMF. Specifically, the processor 1010 can be a processor dedicated to analyzing information received by modem 1002 and/or generating information for transmission on the UL, a processor that controls one or more components of the example embodiment 1000 of a WDMF, a processor that facilitates output of media files on a display screen 1012 or via speaker 1014, and/or a processor that both analyzes information received by modem 1002, generates information for transmission on the UL, controls one or more components of the example embodiment 1000 of a WDMF and facilitates output of media files on a display screen 1012 or via speaker 1014.

Example embodiment 1000 of a WDMF can additionally comprise memory 1008 that is operatively coupled to processor 1010 and that can store data to be transmitted, received data, data associated with analyzed signal and/or interference strength, information related to an assigned channel, power, rate, or the like, and any other suitable information for estimating a channel and communicating via the channel. Memory 1008 can additionally store media files received from a sender over a femto network. Further, memory 1008 can also store user preferences and/or predefined user settings. In one example, memory 1008 can be partitioned, such that locally downloaded media files (e.g. downloaded by an end user) are stored in one partition and remotely downloaded media files (e.g., content(s) 256) are stored in another partition. A number of program modules can be stored in the memory 1008, including an operating system, one or more application programs, other program modules and/or program data. It is appreciated that the specification can be implemented with various commercially available operating systems or combinations of operating systems.

Additionally, a system bus (not shown) can be employed to couple system components including, but not limited to, the system memory 1008 to the processor 1010. The system bus can be any of several types of bus structure that may further interconnect to a memory bus (with or without a memory controller), a peripheral bus, and a local bus using any of a variety of commercially available bus architectures.

The media files, e.g., content(s) 256, received from the mobile wireless network can be displayed on the display screen 1012 and/or audio files can be played via the speaker 1014. It can be appreciated that the media files stored in the memory 1008 can also be received via ports such as, but not limited to, USB, USB2, 1395, SD card, Compact Flash, etc. Additionally, system 1000 can include a power supply/battery 1016 that can be employed to power the system 1000. As an example, power management techniques can be employed to save battery power, such that the battery can last longer between recharge cycles.

An end user can enter commands and information into the example embodiment 1000 of a WDMF through one or more wired/wireless input devices, e.g., a keyboard, a pointing device, such as a mouse and/or a touch screen display 1012. A microphone 1018 can also be employed to enter data. For example, the end user can employ the microphone 1018 to enter an audio clip associated with an image. These and other input devices are often connected to the processor 1010 through an input device interface (not shown) that is coupled to a system bus, but can be connected by other interfaces, such as a parallel port, an IEEE 1394 serial port, a game port, a USB port, an IR interface, etc.

The example embodiment 1000 of a WDMF can further include a codec 1020 that can be employed encode and/or decode digital data. The codec 1020 can employ most any compression and/or decompression algorithm to compress/decompress a received media file. Furthermore, the example embodiment 1000 of a WDMF can include a GPS (global positioning system) 1022 that can be employed to determine the current geographical coordinates of the example embodiment 1000 of a WDMF. The GPS 1022 can include a separate GPS antenna (not shown) or employ the antenna 1004 to communicate with a GPS satellite. In one example, the example embodiment 1000 of a WDMF can receive broadcast warnings, emergency alerts, weather alerts, etc. based on the current coordinates.

In addition, the example embodiment 1000 of a WDMF is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

In view of the example systems described above, example methodologies that can be implemented in accordance with the disclosed subject matter can be better appreciated with reference to flowcharts in FIGS. 11-19. For purposes of simplicity of explanation example methodologies, or methods, are presented and described as a series of acts; however, it is to be understood and appreciated that the claimed subject matter is not limited by the order of acts, as some acts may occur in different orders and/or concurrently with other acts from that shown and described herein. For example, it is to be understood and appreciated that a methodology can alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

Figure 11:
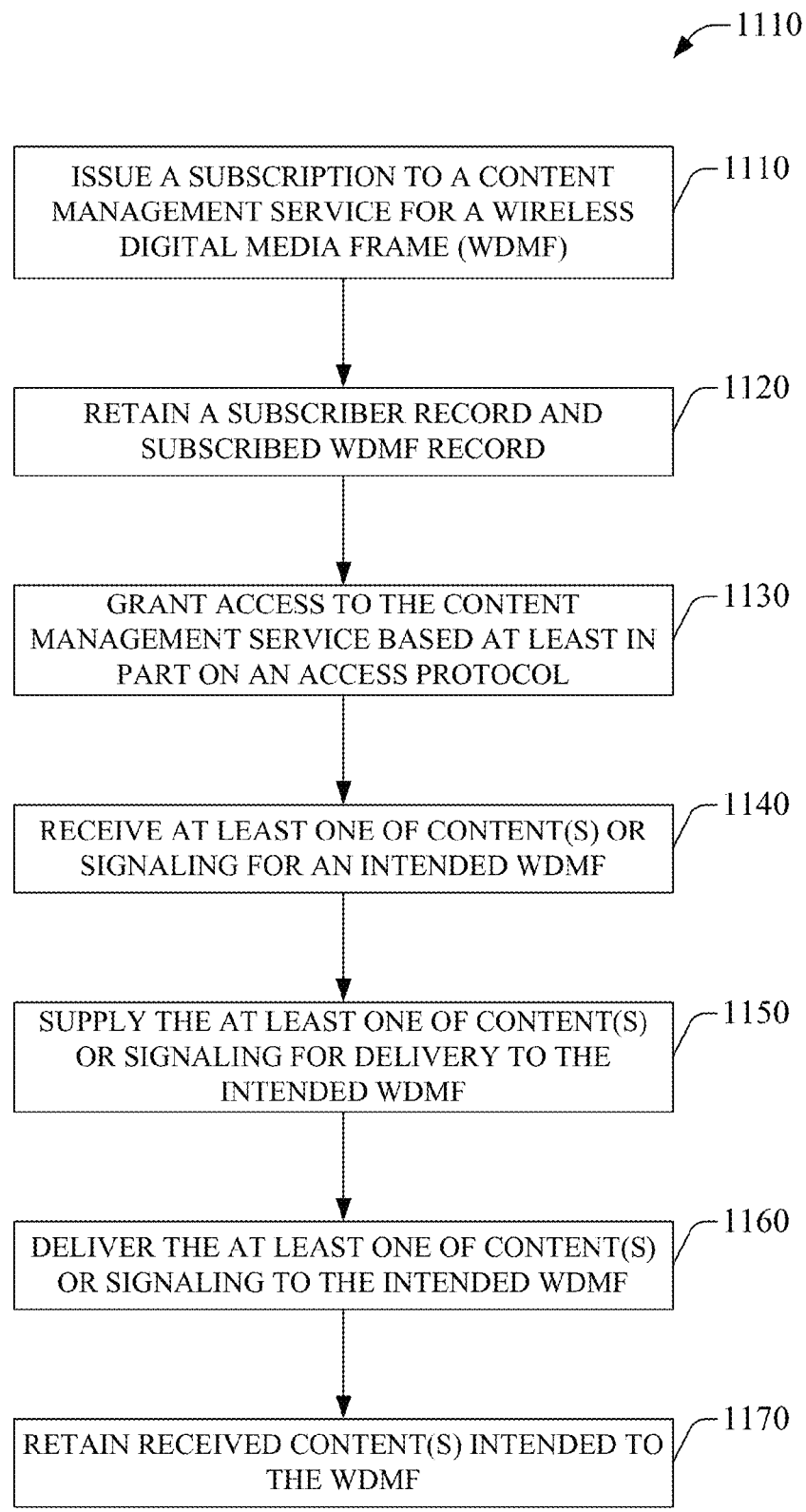
FIG. 11 is a flowchart of an example method for remotely administering multimedia content(s) and signaling to a WDMF in accordance with aspects described herein.

FIG. 11 is a flowchart of an example method 1100 for remotely administering multimedia content(s) and signaling (e.g., instructions or commands) to a wireless digital media frame (WDMF) in accordance with aspects described herein. At act 1110 a subscription to a content management service for a WDMF is issued. As discussed above, a subscription can be issued to a tier of subscribers, wherein the tier includes a primary subscriber, a secondary subscriber, through a K-ary subscriber (K a positive integer). The ability of a K-ary subscriber to manage content(s) in the WDMF can be dictated by the primary subscriber; e.g., through delivery setting(s) 329. At act 1120 a subscriber record and a subscribed WDMF record are retained. In an aspect, a single subscriber can be linked to a set of one or more WDMFs; as an example, an individual can subscribe a first WDMF that resides in a first location that corresponds to the residence of the individual's parents, and a second WDMF in a second location that corresponds to a dwelling (e.g., residence, place of business, work office . . . ) of a relative or spouse of the individual. Part of the subscribed record can include a delivery settings profile that facilitates content delivery within a predetermined schedule. At act 1130, access is granted to the content management service based at least in part on an access protocol. In an aspect, access is granted through a security component (FIG. 3) or through validation of a subscriber's mobile credentials; e.g., SIM or USIM credentials. At act 1210, a subscriber is authorized to access a service interface to convey content(s) to a WDMF. Authorization can be accomplished at least in part through an access protocol or security protocol that can exploit credential(s) associated with a device or apparatus that the subscriber employs to convey content(s) or signaling.

At act 1140, at least one of content(s) or signaling (e.g., commands, instructions) intended for a WDMF are received. At act 1150, the at least one of content(s) or signaling are supplied for delivery to the intended WDMF. In an aspect, supplying the at least one of content(s) or signaling can include conducting integrity checks such as those described hereinbefore, e.g., validating a subscription, validating signaling, performing spam filtering, reformatting content(s), and so forth. At act 1160, the at least one of content(s) or signaling are delivered to the intended WDMF. This act can include formatting content(s) to adjust to a predetermined display resolution in the WDMF; to convert to a specific multimedia format that can be rendered by the WDMF; to compress the content(s) to meet bandwidth constraints, for example imposed by a contracted femto QoS, or improved network scheduling; or the like. When content(s) or signaling is received form a K-ary subscriber, delivery can include an approval cycle, whereby a primary subscriber linked to the K-ary subscriber reviews and approves content for delivery. A primary subscriber can determine, via delivery setting(s), whether a K-ary subscriber can convey the desired content(s) or signal a specific command to a WDMF. At act 1170, received content(s) intended to the WDMF are retained. This act can include compressing the content(s) for storage resource optimization.

Figure 12A:
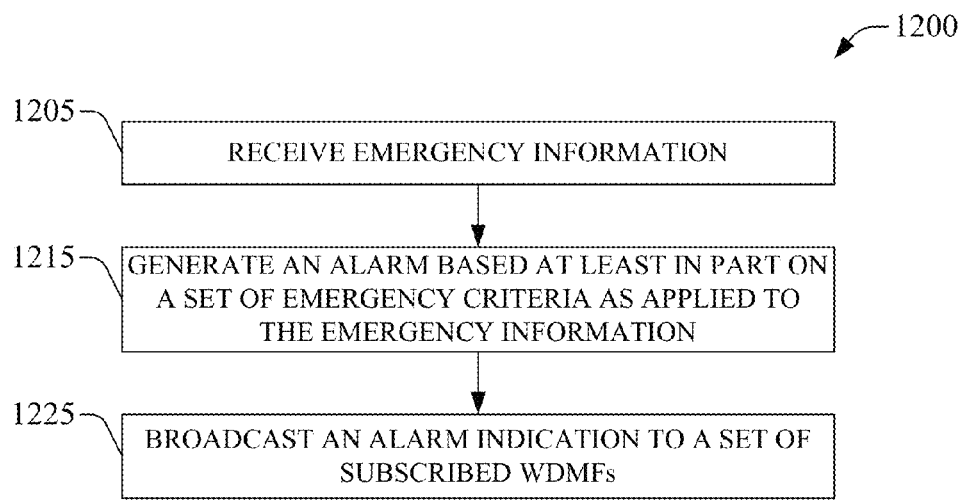
FIGS. 12A-12C present flowchart of example methods for conveying alarms to a WDMF according to aspects described herein.
Figure 12B:
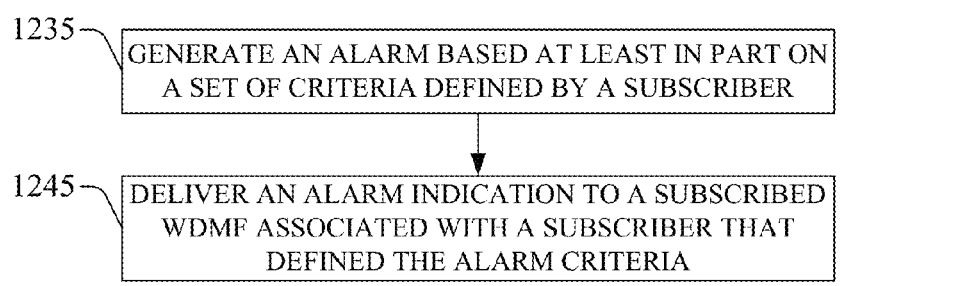
Figure 12C:
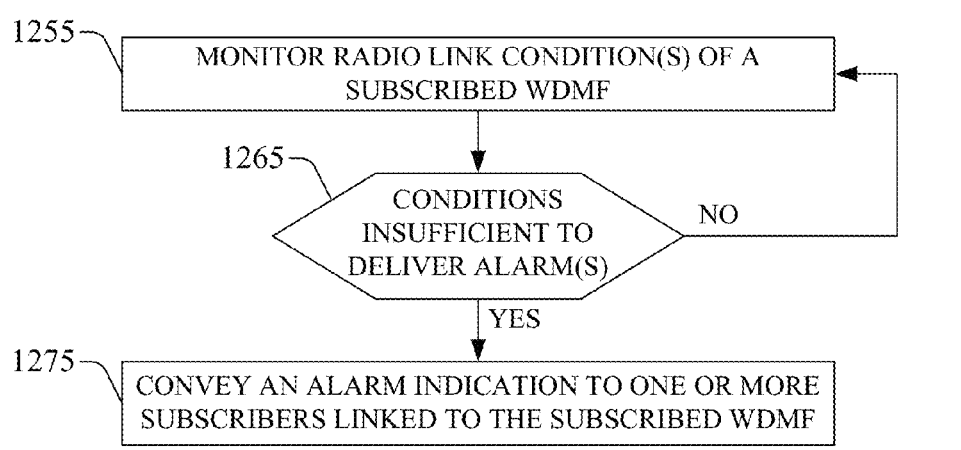

FIGS. 12A-12C present flowcharts of example methods for conveying alarms to a WDMF according to aspects described herein. With respect to FIG. 12A, a flowchart for an example method 1200 to broadcast an emergency alarm is presented. At act 1205, emergency information is received. The information can include the type of emergency (e.g., fire hazards, terrorist attacks, floods, hurricane watch, extreme temperature wave such as a heat wave, snowstorm watch, school shootings . . . ); affected locations; damage management instructions or integrity proceedings (e.g., evacuation, shelter maneuver(s)); or the like. At act 1215, an alarm based at least in part on a set of emergency criteria as applied to the emergency information is generated. At act 1225, an alarm indication is broadcasted to a set of subscribed WDMFs (e.g., WDMF 120$_B$). The set of subscribed WDMFs is determined at least in part on the emergency information; for instance, severity of emergency can be substantially disparate among locations in which served WDMF reside, and thus content management service can determine what WDMFs served via femto access points are to be alerted.

FIG. 12B presents a flowchart of an example method 1230 for conveying customized alarm indication according to aspects described herein. At act 1235, an alarm based at least in part on a set of criteria defined by a subscriber is generated. At act 1245, an alarm indication is delivered to a subscribed WDMF associated with a subscriber that defined the alarm criteria. In an aspect, an alarm indication can be a command to the subscriber WDMF to display alarm indicia such as a predetermined image, specific sound(s).

FIG. 12C is a flowchart of an example method for alerting subscribers (e.g., primary, secondary, tertiary . . . ) linked to served WDMF according to aspects described herein. At act 1255, radio link conditions of a subscribed WDMF are monitored (e.g., conditions of wireless link 135 which covers WDMF 120$_B$). In an aspect, radio link conditions such as SNR, SNIR, DL-PRSOT, or the like, can be monitored based at least in part upon a schedule determined by a content management service provider. At act 1265 it is assessed whether conditions are insufficient to deliver alarm(s). In an aspect, the assessment can include analysis of success rate of delivery of previously delivered alarm(s), e.g., either actual alarm(s) or simulated evaluation alarm(s), at current radio link conditions. At act 1275, an alarm indication is conveyed to one or more subscribers (e.g., subscriber 250$_1$, secondary subscriber 250$_2$ . . . ) linked to the subscribed WDMF.

Figure 13:
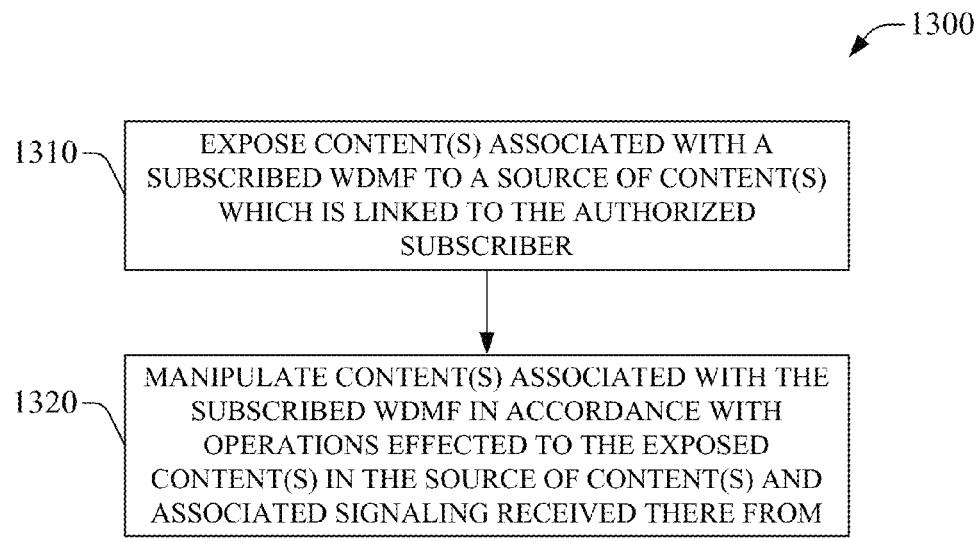
FIG. 13 is a flowchart of an example method for operating on content(s) directed to a WDMF according to aspects described herein.

FIG. 13 is a flowchart of an example method 1300 for operating on content(s) directed to a WDMF according to aspects described herein. In an aspect, this example method 1300 can be enacted in conjunction with example method 1100. Additionally, a component that resides within the mobile network platform can enact the subject example method. At act 1310, content(s) associated with a subscribed WDMF (e.g., WDMF 120$_B$) are exposed to a source of content(s) linked to an authorized subscriber. In an aspect, content(s) are exposed by transmitting an indication of content(s) extant in the subscribed WDMF to the source of content(s). In an aspect, an indication can be a system file that carries information of a file structure of available content(s) in the subscribed WDMF. At act 1320, content(s) associated with the subscribed WDMF are manipulated in accordance with operations effected to the conveyed content(s) in the source of content(s) and associated signaling there from. It should be appreciated that signaling is received from a device or apparatus the subscriber utilizes to convey content(s).

Figure 14:
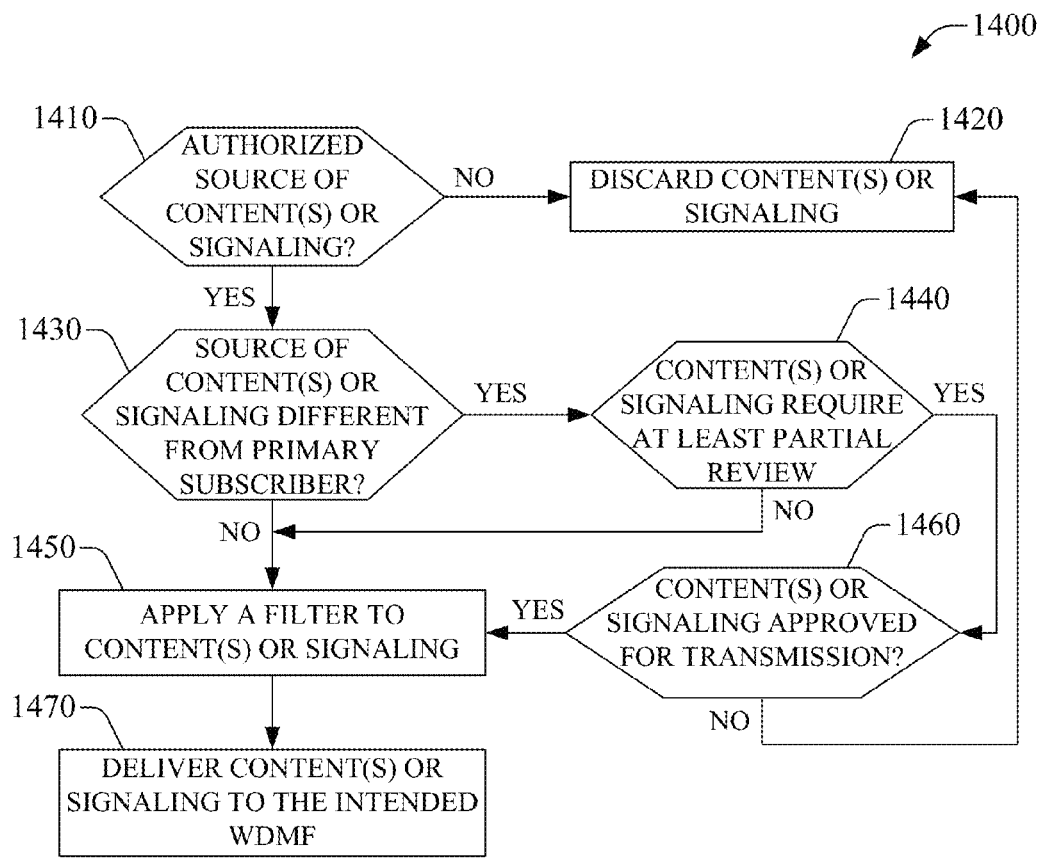
FIG. 14 presents a flowchart of an example method to manage content(s) or signaling directed for delivery to a subscribed WDMF according to aspects described herein.

FIG. 14 presents a flowchart of an example method 1400 to manage content(s) or signaling directed for delivery to a subscribed WDMF according to aspects described herein. This example method 1400 can be implemented through a component (e.g., content manager component 210) that resides within the mobile network platform. At act 1410, it is checked whether the source of content(s) or signaling is an authorized source. In the affirmative case, it is probed at act 1430 whether the source of content(s) or signaling is different from a primary subscriber (e.g., primary subscriber 250$_1$) linked to the subscribed WDMF (e.g., WDMF 120$_B$). It should be appreciated that for sources of content(s) or signaling that engage in an authorization protocol, or security protocol, and are granted access, check act 1410 validates such sources of content(s). When outcome of check act 1410 is negative, content(s) or signaling is discarded at act 1420. With respect to validation act 1430, a negative outcome results in content(s) or signaling being applied a filter at act 1450; a filter can be a spam filter. Conversely, an affirmative outcome in act 1430 leads to validation act 1440, in which it is probed whether content(s) or signaling require at least a partial review. When outcome of act 1440 is negative, flow is directed to act 1450. Conversely, at act 1460 it is probed whether content(s) or signaling are approved for transmission; upon approval, or authorization is granted, flow is directed to act 1450. When authorization is declined, content(s) or signaling is discarded at act 1430. At act 1470, content(s) or signaling delivered to the intended WDMF.

Figure 15:
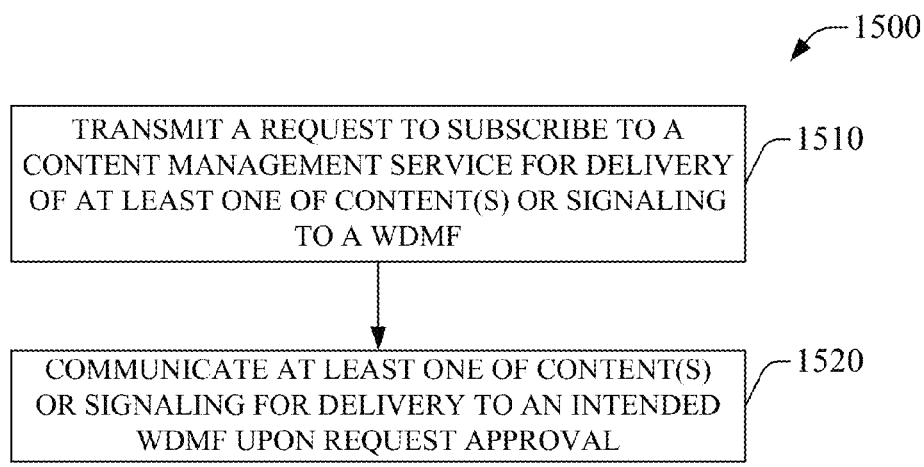
FIG. 15 presents a flowchart of an example method for managing content intended to a WDMF according to aspects described herein.

FIG. 15 presents a flowchart of an example method 1500 for managing content intended to a WDMF according to aspects described herein. The subject example method can be enacted through a device or apparatus, wireless or otherwise. At act 1510, a request to subscribe to a content management service for delivery of at least one of content(s) or signaling to a WDMF is transmitted. At act 1520, at least one of content(s) or signaling for delivery to an intended WDMF is communicated upon request is approved.

Figure 16:
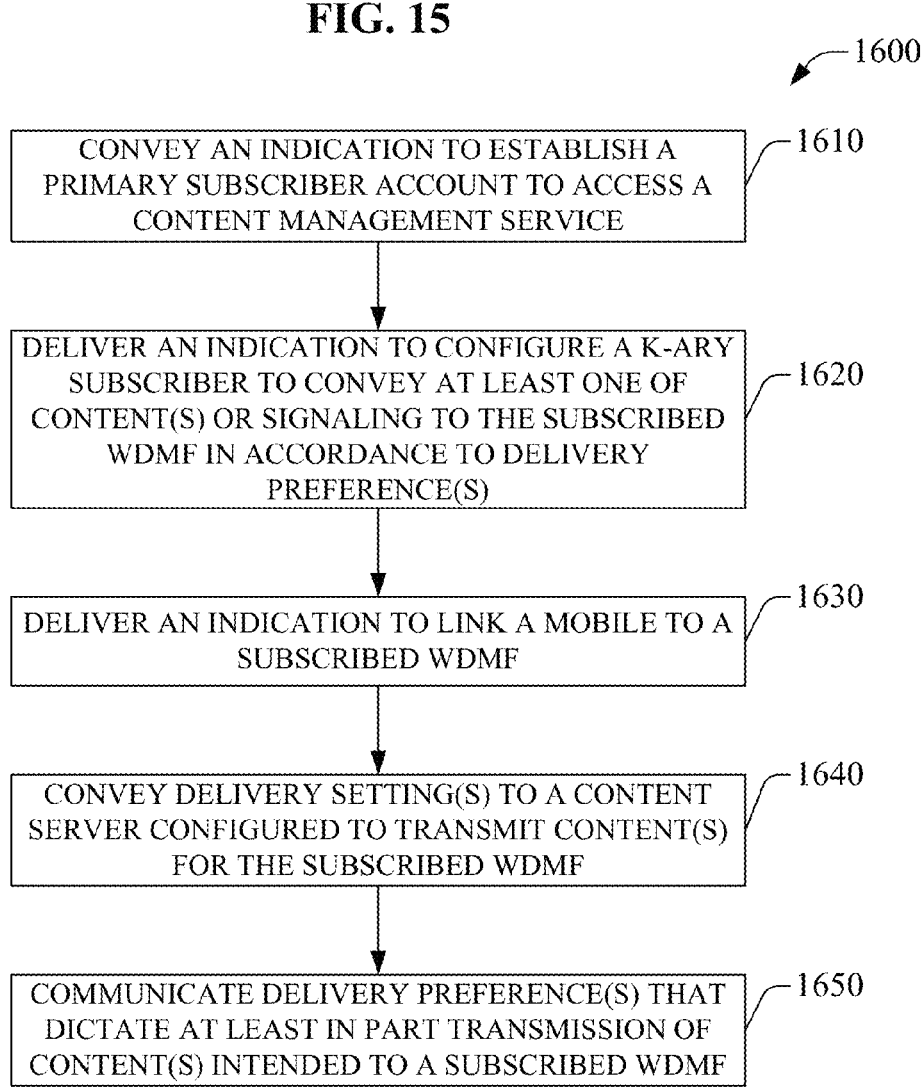
FIG. 16 presents a flowchart of an example method for delivering content(s) and signaling to an intended WDMF according to aspects described herein.

FIG. 16 presents a flowchart of an example method 1600 for delivering content(s) and signaling to an intended WDMF according to aspects described herein. At act 1610, an indication to establish a primary subscriber account to access a content management service is conveyed. At act 1620, it is delivered an indication to configure a K-ary subscriber (K a positive integer) to convey at least one of content(s) or signaling to the subscribed WDMF (e.g., WDMF $120_B$) in accordance to delivery preference(s) (e.g., delivery setting(s) 329). At act 1630, an indication to link a mobile to a subscribed WDMF is delivered. The mobile can be associated with any or substantially any of the primary subscriber or K-ary subscribers. At act 1640, delivery setting(s) are conveyed to a content server (e.g., content server(s) 615) configured to transmit content(s) for the subscribed WDMF. At act 1650, delivery preference(s) that dictate at least in part transmission of content(s) to a subscribed WDMF. In an aspect, the delivery preferences (e.g., delivery setting(s) 329) are communicated to a content management service (e.g., service provided via content manager component 215) that facilitates delivery of the content(s).

Figure 17:
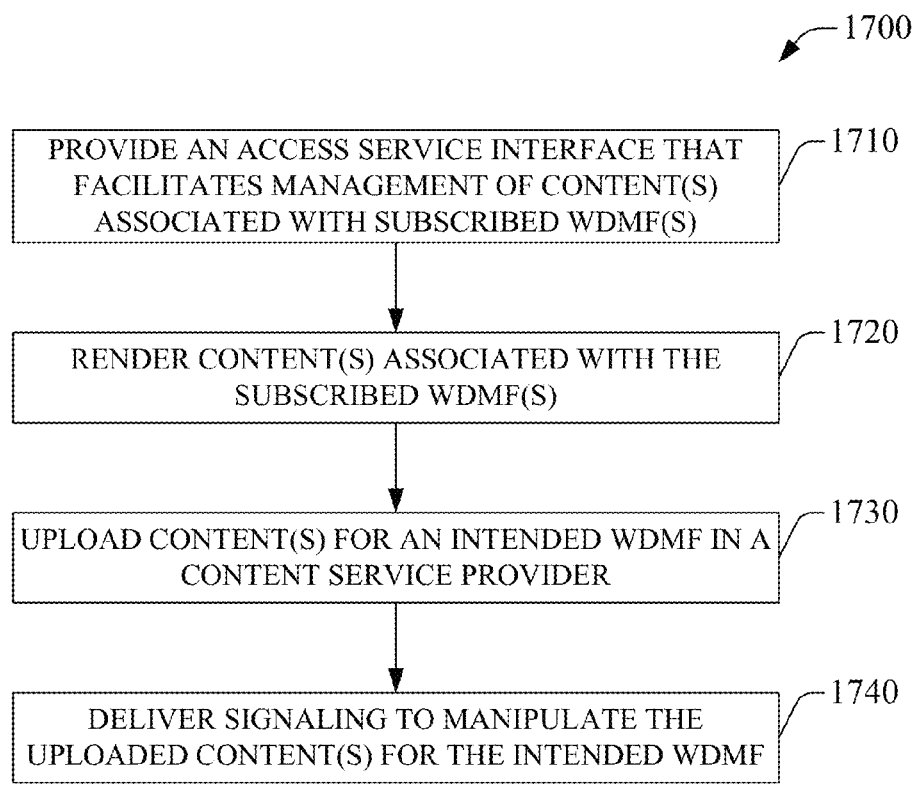
FIG. 17 is a flowchart of an example method to administer content(s) associated with a subscribed WDMF according to aspects of the subject innovation.

FIG. 17 is a flowchart of an example method 1700 to administer content(s) associated with a subscribed WDMF according to aspects described herein. In an aspect, a device or apparatus can enact the subject example method; the device or apparatus can operate wirelessly or otherwise. At act 1710, an access service interface (e.g., access component 445) that facilitates management of content(s) associated with subscribed WDMF(s) is provided. In an aspect, the access service interface is an application programming interface (API) that is executed by a processor within the device or apparatus that enacts the subject example method. At act 1720, content(s) associated with subscribed WDMF(s) are rendered. A display interface (e.g., display interface 935) that is a part of the device or apparatus that enacts the subject method can be utilized to render the contents. Content(s) can be rendered in various display formats (see, e.g., FIG. 8). In an aspect, content(s) are rendered in a manner that facilitates manipulation thereof through a variety of gestures like mouse, trackball, or joystick clicks, a drag-and-drop maneuver, a tap in case display interface provides a touch screen, a hover of an object such as a subscriber hand, a voice command, and so on. At act 1730, content(s) for an intended WDMF are uploaded in a content management service provider (e.g., content manager component 210; FIGS. 2A-2B). In an aspect, uploading content(s) for an intended WDMF in a content service provider includes performing at least one of a click gesture, a touch gesture, drag-and-drop gesture, a hover gesture, or a voice command. At act 1740, signaling (e.g., command(s) or instruction(s)) to manipulate the uploaded content(s) for, or existing content(s) in, the intended WDMF are delivered. In an aspect, the signaling includes command(s) or instruction(s) that are native to the intended WDMF. In another aspect, such commands can be a subset of a group of commands supported by the WDMF, the subset determined by configuration information in a subscriber account (e.g., subscriber account(s) 327).

Figure 18:
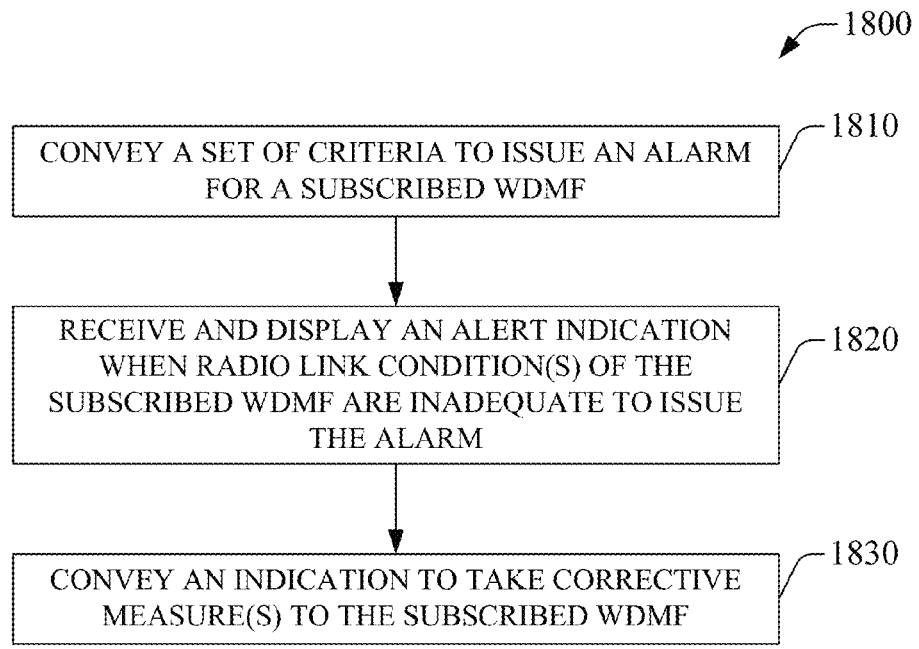
FIG. 18 is a flowchart of an example method for alerting to inadequate condition(s) to alarm a subscribed WDMF according to aspects described herein.

FIG. 18 is a flowchart of an example method 1800 for alerting to inadequate condition(s) to alarm a subscribed WDMF according to aspects described herein. In an aspect, a device or apparatus can enact the subject example method; the device or apparatus can operate wirelessly or otherwise. It should be appreciated that this example method 1800 can be employed in conjunction with almost any example method described herein. At act 1810, a set of criteria to issue an alarm for a subscribed WDMF is conveyed; e.g., as part of signaling. At act 1820, an alert indication (e.g., signaling that conveys a specific message to display, a sound to play, a light to actuate, a vibration to effect . . . ) is received and rendered or enacted when radio link condition(s) of the subscribed WDMF are inadequate to issue the alarm. At act 1830, an indication to take corrective measure(s) to the subscribed WDMF is conveyed. In an aspect, the indication can be conveyed through signaling that instructs a WDMF to display specific content (e.g., an image or message) or play a sound, etc. It should be appreciated that even though radio link in the wireless environment of the WDMF can be deemed in failure for delivering alarm(s), the radio link strength can be sufficient to deliver a message indicating that corrective measures are necessary and related instructions.

Figure 19:
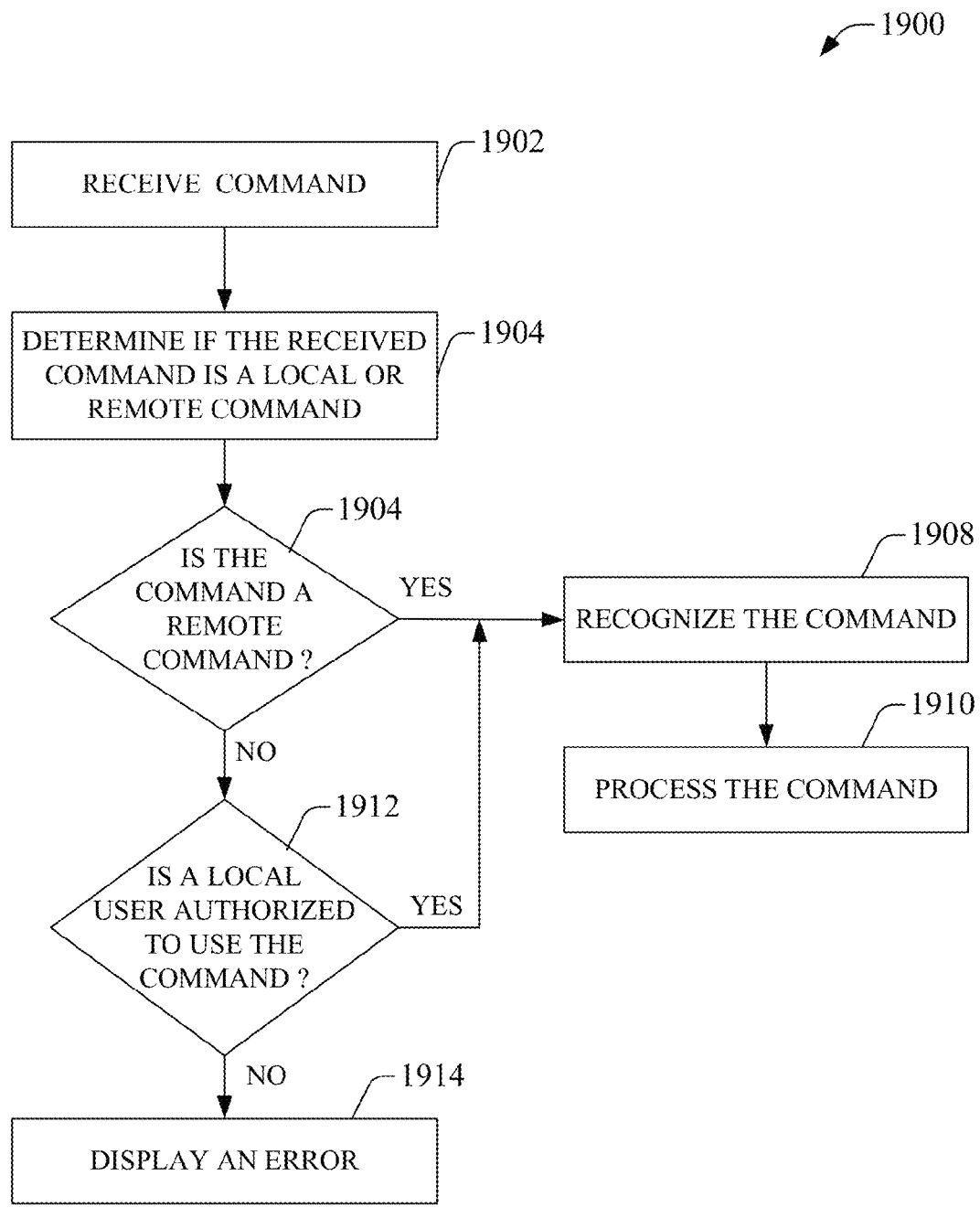
FIG. 19 illustrates an example methodology that can be employed to process commands received by a wireless enabled digital media frame in accordance with an aspect of the subject disclosure.

FIG. 19 illustrates an example method 1900 for processing commands received by a WDMF according to aspects described herein. In an aspect, a system subscriber can send one or more commands, e.g., through signaling 254, via mobile network platform 205, and transmitted through backhaul pipe 153, to control media display management and/or scheduling within a WDMF. Further, the primary subscriber, or system subscriber, also can specify commands that an end user can utilize.

At act 1902, a command is received. At act 1904, a determination can be made whether the received command is a remote command or a local command. A remote command can be received remotely through mobile network platform 205 as described supra, and can be sent by a primary subscriber, a secondary subscriber or other K-ary subscriber. A local command can be entered by an end user by employing most any input device. At act 1906, it can be determined if the received command, e.g., received via signaling 258, is a remote command received over a femto access point (e.g., femto AP 130) operated by mobile network platform 205. The remote command can be recognized at act 1908 and processed accordingly at act 1910. As an example, a remote command can be employed by a primary subscriber, or system subscriber, to modify display settings in an intended WDMF, receive media files, save media files, delete media files, display particular images, play audio clips, receive MMS communication(s), SMS communication(s) or MBMS communication(s); prompt a generation and delivery of a report of current memory status in an intended WDMF; place or receive a voice call, or the like. When a local command is received, a determination can be made if a local user (e.g., end user) is authorized to utilize the local command, as indicated in verification act 1912. According to an aspect, local user(s) can have limited access to commands that can be specified, and conveyed, by a primary subscriber or system subscriber. When the local user is not authorized to employ the received local command, an error message can be displayed to the local user at act 1914; for example, an indication that the local user is not authorized to perform this command can be displayed in a display interface (e.g., display 805). Conversely, if the local user is authorized to employ the received local command, the local command can be recognized at act 1908 and processed at act 1910.

Figure 20:
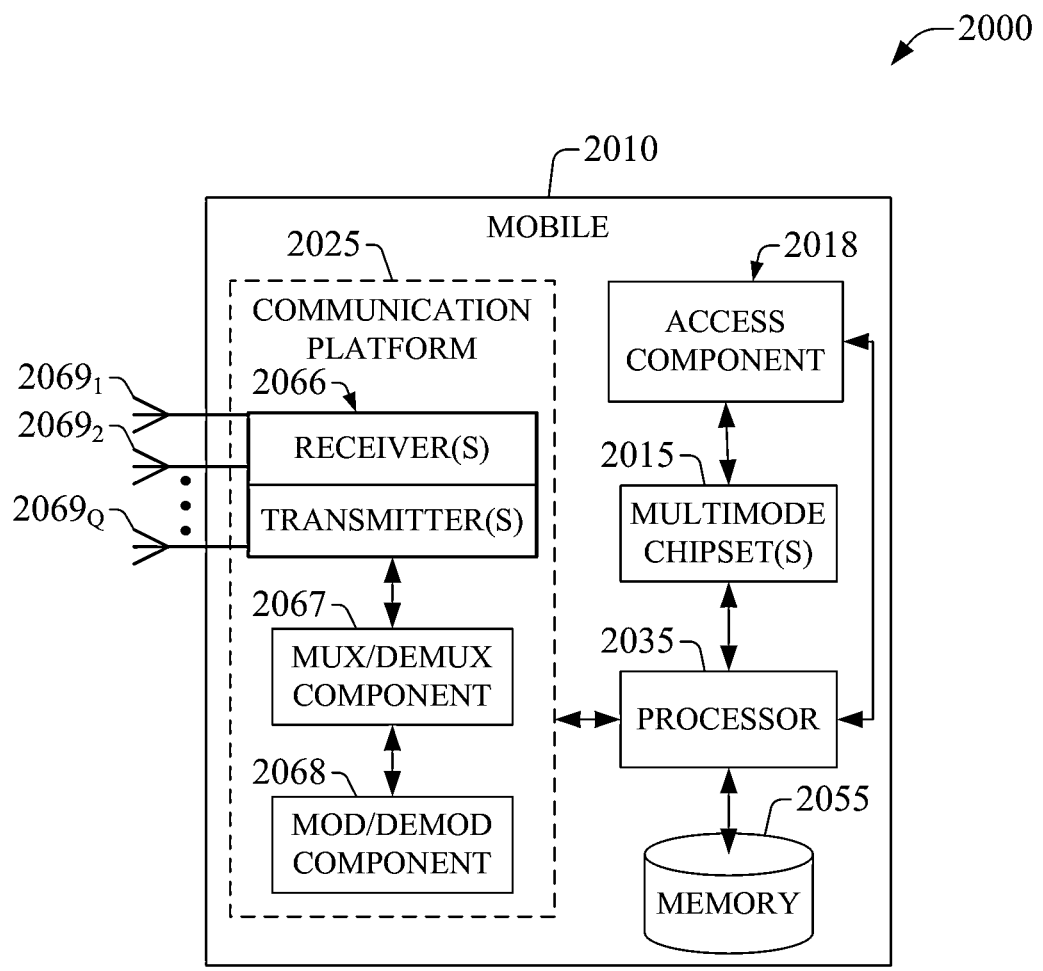
FIG. 20 illustrates a block diagram of an example embodiment of a mobile that can deliver content(s) or signaling directed to a WDMF in accordance with aspects described herein.
Figure 21:
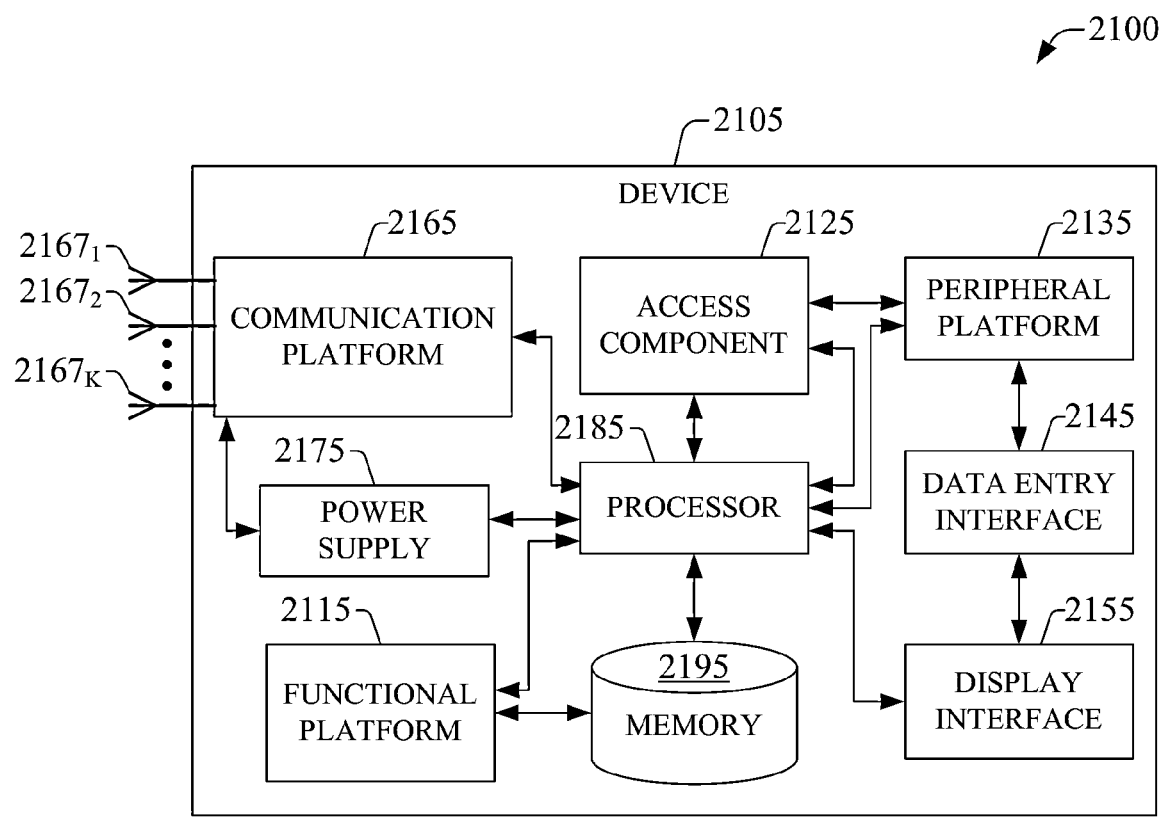
FIG. 21 is a block diagram of an example embodiment of a non-mobile device that can convey content(s) exploit various aspects of content transaction(s) as described herein.
Figure 22:
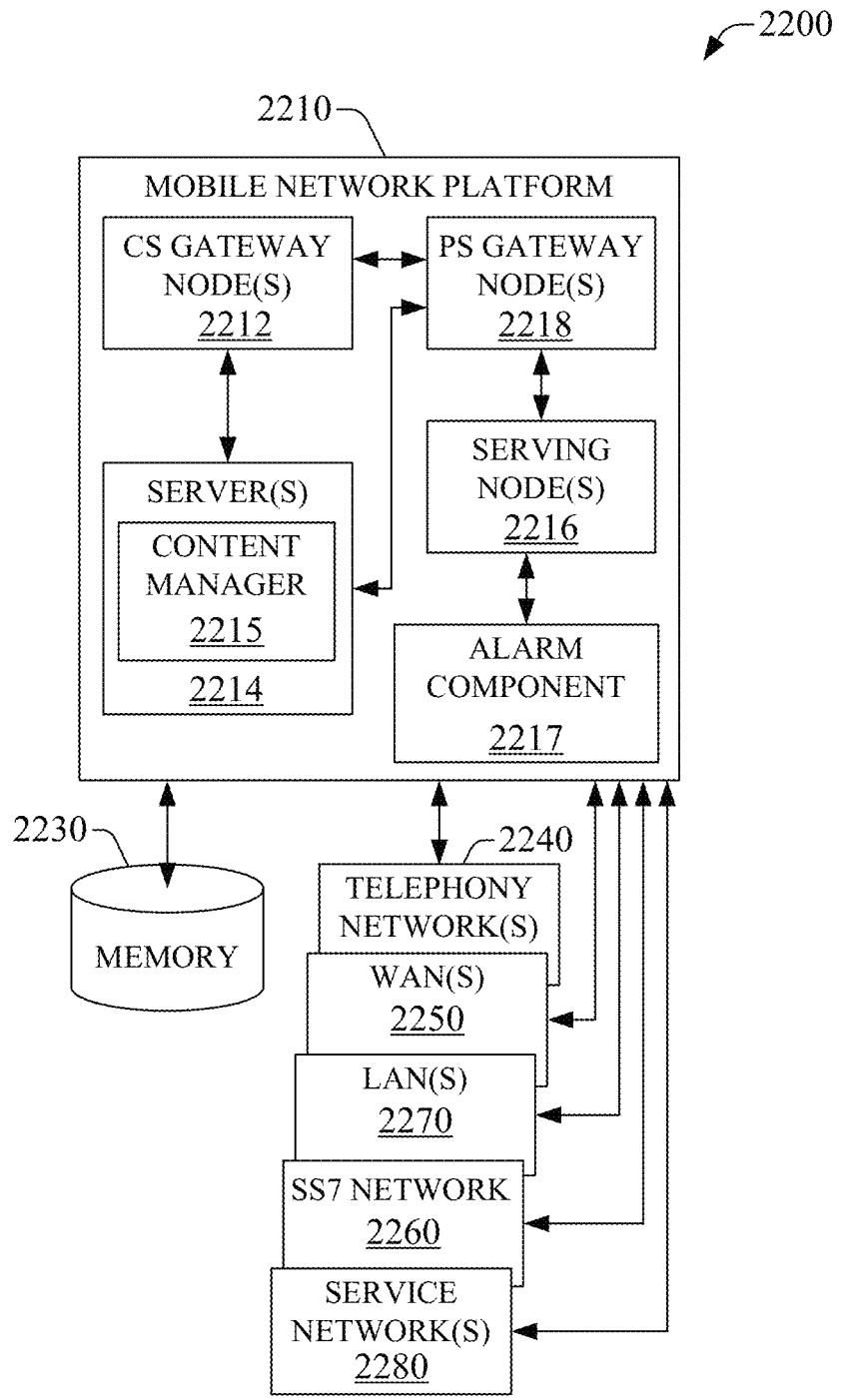
FIG. 22 presents an example embodiment of a mobile network platform which can provide a content management service for content(s) and signaling directed to a WDMF in accordance with aspects described herein.

To provide further context for various aspects of the subject specification, FIG. 20 illustrates a block diagram of an example embodiment 2000 of a mobile 2010 that can deliver content(s) or signaling directed to a WDMF in accordance with aspects described herein. Additionally, FIG. 21 presents a block diagram of an example embodiment 2100 of a non-mobile device 2105, which can be provisioned through a non-mobile network platform and can be employed to convey content(s) or signaling to a predetermined WDMF in accordance with aspects described herein. Furthermore, FIG. 22 presents an example embodiment 2200 of a mobile network platform 2110 which can provide content management service in accordance with aspects described herein.

In mobile 2010, which can be a multimode access terminal, a set of antennas $2069_1$-$2069_Q$ (Q is a positive integer) can receive and transmit signal(s) from and to wireless devices like access points, access terminals, wireless ports and routers, and so forth, that operate in a radio access network. It should be appreciated that antennas $2069_1$-$2069_Q$ are a part of communication platform 2025, which comprises electronic components and associated circuitry that provide for processing and manipulation of received signal(s) and signal(s) to be transmitted; e.g., receivers and transmitters 2066, mux/demux component 2067, and mod/demod component 2068. Operation of communication platform 2025 is substantially the same as operation of communication platform 915; respective components or elements in communication platform 2010 operates in substantially the same manner as those components or elements in communication platform 915.

In embodiment 2000, multimode operation chipset(s) 2015 allows mobile 2010 to operate in multiple communication modes in accordance with disparate technical specification for wireless technologies. In an aspect, multimode operation chipset(s) 2015 utilizes communication platform 2025 in accordance with a specific mode of operation (e.g., voice, Global Positioning System (GPS)). In another aspect, multimode operation chipset(s) 2015 can be scheduled to operate concurrently (e.g., when Q>1) in various modes or within a multitask paradigm.

Mobile 2010 includes access component 2018 which operates in substantially the same manner as access component 445, and can convey content(s) or signaling directed to a WDMF in accordance with aspects described in the subject specification. It should be appreciated that access component 2018, can include a display interface that render content in accordance with aspects of an interface component (not shown) that resides within access component 2018.

Mobile 2010 also includes a processor 2035 configured to confer functionality, at least in part, to substantially any electronic component within mobile 2010, in accordance with aspects of the subject innovation. As an example, processor 2035 can be configured to execute, at least in part, instructions in multimode operation chipset(s) that afford multimode communication through mobile 2010 like concurrent or multitask operation of two or more chipset(s). As another example, processor 2035 can facilitate mobile 2010 to receive and convey signaling and content(s) (e.g., various data flows) that are part of an active management act initiated by a subscriber that operates mobile 2010, or an approval cycle associated with auxiliary subscribers (e.g., secondary subscriber, tertiary subscriber . . . ). Moreover, processor 2035 facilitates mobile 2010 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 2055 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In embodiment 2000, processor 2035 is functionally coupled (e.g., through a memory bus) to memory 2055 in order to store and retrieve information necessary to operate and/or confer functionality, at least in part, to communication platform 2025, multimode operation chipset(s) 2015, access component 2018, and substantially any other operational aspects of multimode mobile 2010.

FIG. 21 is a block diagram of an example embodiment 2100 of a non-mobile device that can convey content(s) exploit various aspects of content transaction(s) as described herein. Device 2105 includes a functional platform 2115 that comprises a set of components (not shown) that provide, at least in part, one or more specific functionalities of the non-mobile device 2105. Additionally, non-mobile device 2105 includes an access component 2125 that operates in accordance with aspects described hereinbefore. Moreover, in an aspect, non-mobile device 2105 can include a communication platform 2165 that can provide wireless communication capabilities in addition, or alternatively, to connectivity of non-mobile device 2105 through wired links (e.g., Ethernet, USB, GPIB, RS-232, FireWire, optical or coaxial cable connection to a network interface such as network interface 176, or router (not shown)). With respect to wireless capability, in non-mobile device 2105, which can be a multimode access terminal, a set of antennas $2167_1$-$2067_P$ (P is a positive integer) can receive and transmit signal(s) from and to wireless devices like access points, access terminals, wireless ports and routers, etc., that operate in a radio access network. Communication platform 2165 can exploit the set of P antennas $2167_1$-$2167_K$, (K is a positive integer) to establish communication within various modes such as single-input single-output, or multiple-input multiple output. Communication platform 2165 operates in substantially the same manner as communication platform 915.

Additionally, in non-mobile device 2105, a peripheral component 2135 can include, or facilitate connection to, additional devices such as printer(s), media player(s), wireless router(s) (e.g., network interface 115), biometrics touchpad(s), etc. In an aspect, to afford such connectivity, peripheral component 2135 can include jacks for one or more of Ethernet, USB, GPIB, RS-232, FireWire, optical or coaxial cable connectors. Additionally, display interface 2155 can be a part of functional platform 2115 (e.g., when non-mobile device 2105 is a PC, an IPTV interface, a mobile, a back-projector component, a data projector . . . ). Display interface 2155 operates in substantially the same manner as display interface 925, and possess similar to those of display interface 925. In an aspect, and like display interface 925, display interface 2155 can be a liquid crystal display (LCD), a plasma panel, a monolithic thin-film based electrochromic display, and so on. It should be appreciated that rendering areas in display interface 925 and 2155 can be substantially disparate.

It should be appreciated that non-mobile device 2105 also can include a data entry interface 2145 that can allow an end user to perform at least one of (i) command non-mobile device 1405 via configuration of functional platform 2115, (ii) deliver content(s) or signaling directed to a WDMF in accordance to aspects described herein, or (iii) generate content(s) (e.g., images via a built-in camera) or directive(s) for a subscribed WDMF. It should be appreciated that data entry interface 2145 can operate substantially the same manner as data entry interface 935, and has substantially the same features thereof.

Power supply 2175 can power-up device 2105 and substantially any component included thereon. It should be appreciated that alternative or additional embodiments of device 1405 may not include power supply 1475 and be powered via an attachment to a conventional power grid.

In embodiment 2100, non-mobile device 2105 includes processor 2185 which can be functionally coupled (e.g., through a memory bus) to memory 2195 in order to store and retrieve information necessary to operate and/or confer functionality, at least in part, to access component 2125, and substantially any component(s) thereon in accordance with aspects described herein; functional platform 2115; communication platform 2165 when non-mobile device 174 includes it; and substantially any other component of non-mobile device 2105. With respect to access component 2125, and components thereon, processor 2185 can be configured to execute access protocols to convey credentials and gains access to a content management service to convey multimedia content(s) or signaling to a subscribed WDMF. In addition, in connection with communication platform 2165, processor 2105 is configured to confer functionality, at least in part, to substantially any electronic component within communication platform 2165, in accordance with aspects of the subject innovation. Moreover, processor 2185 facilitates communication platform 2165 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 2195 also can retain multimedia content(s) which can be directed to a WDMF in accordance with aspects of the subject innovation, or security credentials (e.g., passwords, encryption keys, digital certificates) that facilitate access to a content management service (e.g., content manager component 210). In addition, memory 1455 can store data structures (e.g., metadata); code structure(s) (e.g., modules, objects, classes, procedures) or instructions, or substantially any type of software or firmware that processor 2185 can execute to provide functionality associated with functional platform 1415; network or device information like policies and specifications; code sequences for scrambling, spreading and pilot (e.g., reference signal(s)) transmission; and so on.

As indicate supra, FIG. 22 presents an example embodiment 2200 of a mobile network platform 2210 which can provide a content management service for content(s) and signaling directed to a WDMF in accordance with aspects described herein. Generally, mobile network platform 2210 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, as described above, component within PS domain of network platform 2210 can be employed to effect communication among sources of content(s) and subscriber WDMFs in accordance with aspects described herein.

With respect to CS communication, mobile network platform 2210 includes CS gateway node(s) 1512 which can interface CS traffic received from legacy networks like telephony network(s) 2240 (e.g., public switched telephone network (PSTN), or public land mobile network (PLMN)) or a SS7 network 2260. Circuit switched gateway node(s) 2212 can authorize and authenticate traffic (e.g., voice) arising from such networks. Additionally, CS gateway node(s) 2212 can access mobility, or roaming, data generated through SS7 network 2260; for instance, mobility data stored in a visitation location register (VLR), which can reside in memory 2230. Moreover, CS gateway node(s) 2212 interfaces CS-based traffic and signaling and gateway node(s) 2218. As an example, in a 3GPP UMTS network, CS gateway node(s) 2212 can be embodied, at least in part, in gateway GPRS support node(s) (GGSN). In an aspect, CS gateway node(s) can embody, at lease in part, gateway node(s) 165.

In the subject innovation, in addition to receiving and processing CS-switched traffic (e.g., content(s) that can be part of a content(s) transmitted by a service provider platform 610) and signaling, PS gateway node(s) 2218 can authorize and authenticate PS-based data sessions with served (e.g., through RAN 185) mobile devices, non-mobile devices, WDMFs through femto cell access points. Data sessions can include traffic, or content(s), exchange with networks external to the mobile network platform 2210, like wide area network(s) (WANs) 2250 or service network(s) 2280; it should be appreciated that local area network(s) (LANs) 2270 can also be interfaced with mobile network platform 2210 through PS gateway node(s) 2218. It is to be noted that WANs 2250 and LANs 2270 can embody, at least in part, service provider platform 610. Packet-switched gateway node(s) 2218 generates packet data contexts when a data session is established. To that end, in an aspect, PS gateway node(s) 2218 can include a tunnel interface (e.g., tunnel termination gateway (TTG) in 3GPP UMTS network(s) (not shown)) which can facilitate packetized communication with disparate wireless network(s), such as femto network platform and associated radio access network (e.g., femto APs 130 and radio links 135), Wi-Fi networks. It should be further appreciated that the packetized communication can include multiple flows that can be generated through service (e.g., provisioning) and application server(s) 2214. It is to be noted that in 3GPP UMTS network(s), PS gateway node(s) 2218 (e.g., GGSN) and tunnel interface (e.g., TTG) comprise a packet data gateway (PDG). In an aspect, PS gateway node(s) 2218 can embody, at lease in part, gateway node(s) 229.

In embodiment 2200, mobile network platform 2210 also includes serving node(s) 2216 that convey the various packetized flows of data streams (e.g., content(s) or signaling directed to a subscribed WDMF), received through PS gateway node(s) 2218. As an example, in a 3GPP UMTS network, serving node(s) 2216 can be embodied in serving GPRS support node(s) (SGSN). In an aspect, serving node(s) 2216 can embody, at least in part, content server(s) 615 in service provider platform 610. In another aspect, serving node(s) 2216 can embody, at least in part, serving node(s) 227.

Server(s) 2214 in mobile network platform 2210 can execute numerous applications (e.g., location services, online gaming, wireless banking, wireless device management . . . ) that can generate multiple disparate packetized data streams or flows, and manage (e.g., schedule, queue, format . . . ) such flows. Such application(s), for example can include add-on features to standard services provided by mobile network platform 2210. Data streams (e.g., content(s) or signaling directed to a WDMF) can be conveyed to PS gateway node(s) 2218 for authorization/authentication and initiation of a data session, and to serving node(s) 2216 for communication thereafter. It should be appreciated that PS gateway node(s) 2218 associated with a macro network platform 108 can authorize, or grant access, to content management service, and PS gateway node(s) 2218 associated with femto network platform 109 can carry out communication with serving node(s) 2216 related to femto network platform 109. Server(s) 1514 can also effect security (e.g., implement one or more firewalls) of mobile network platform 2210 to ensure network's operation and data integrity in addition to authorization and authentication procedures that CS gateway node(s) 1512 and PS gateway node(s) 2218 can enact. Moreover, server(s) 2214 can provision services from external network(s), e.g., WAN 2250, or Global Positioning System (GPS) network(s) (not shown). It is to be noted that server(s)

2214 can include one or more processor configured to confer at least in part the functionality of macro network platform 2210. To that end, the one or more processor can execute code instructions stored in memory 2230, for example. It is should be appreciated that server(s) 2214 can include a content manager 2215, which operates in substantially the same manner as described hereinbefore in connection with content manager component 210. Server(s) 2214 also can facilitate operation of alarm component 2217 in substantially the same, or the same, manner as alarm component 265. Furthermore, server(s) 2214 can embody, at least in part, content server(s) 615 in service provider platform 610. It is noted that service network(s) 2280 also can embody, at least in part, service provider platform 610.

In example wireless environment 2200, memory 2230 can store information related to operation of mobile network platform 2210. Information can include content(s) directed to WDMF received from various sources of content(s), as described herein, subscriber account(s) 327 and associated credential(s), and delivery settings(s) 329, additional subscriber data; pricing schemes, e.g., promotional rates, flat-rate programs, couponing campaigns; technical specification(s) of served WDMFs; and so forth. Memory 2230 can also store information from at least one of telephony network(s) 2240, WAN 2250, LAN 2270, SS7 network 2260, or service network(s) 2280.

One or more embodiments of this application may relate to co-pending, and commonly assigned, U.S. patent application Ser. No. 12/325,812, filed on Dec. 1, 2008, entitled "PORTABLE WIRELESS ENABLED DIGITAL MEDIA FRAME." The entirety of this application is incorporated herein by reference.

Various aspects or features described herein may be implemented as a method, apparatus, or article of manufacture using standard programming and/or engineering techniques. In particular, the aspects or features can be implemented through program modules stored in a memory and executed by a processor, and/or other combination of hardware and software, e.g., firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise provisioning information; security credentials and algorithms; files and applications; policies such as alarm(s) criteria and alarm reports; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory to store instructions; and
    a processor coupled to the memory that facilitates execution of the instructions to perform operations, comprising:
        receiving content from a content source device;
        determining, based on subscriber data, whether a subscriber account is a primary subscriber account, wherein the subscriber data comprises first data representing the primary subscriber account and second data representing a set of secondary subscriber accounts; and
        in response to determining that the subscriber account is linked to the primary subscriber account, permitting delivery of the content via a femto cell device of a set of femto cell network devices to a display device linked to the primary subscriber.

2. The system of claim 1, wherein the display device comprises a wireless digital media frame device.

3. The system of claim 1, wherein the femto cell device enables wireless coverage for the display device via the set of femto cell network devices.

4. The system of claim 1, wherein the content comprises emergency data representing an emergency notification.

5. The system of claim 4, wherein the emergency notification is an alarm message to be displayed on the display device.

6. The system of claim 1, wherein the operations further comprise approving the content before the content is delivered to the display device.

7. The system of claim 6, wherein the approving the content comprises approving the content based on a quality of service determined to be associated with the display device.

8. The system of claim 6, wherein the approving the content comprises approving the content based on a parameter defined by a primary subscriber identity of the primary subscriber account.

9. The system of claim 1, wherein the set of femto cell network devices provides wireless coverage for the display device, wherein the display device is a wireless digital media frame display device.

10. The system of claim 1, wherein the operations further comprise:
receiving emergency information;
generating an alarm in response to the emergency information being determined to satisfy a criterion; and
delivering the alarm to the display device via the set of femto cell network devices based on the subscriber account being determined to be linked to the primary subscriber account according to another criterion defined by the first data.

11. A method, comprising:
authorizing, by a system comprising a processor, a subscriber identity associated with subscriber account data to receive content from a content source device based on an access protocol, wherein the access protocol comprises a set of rules relating to permitting delivery of the content to a display device associated with the subscriber identity based on a quality of service determined to be associated with femto cell coverage; and
utilizing, by the system, the femto cell coverage of a femto cell network device to facilitate delivery of the content to the display device associated with the subscriber identity after authorization of the subscriber identity.

12. The method of claim 11, further comprising receiving, by the system, the content from the content source device.

13. The method of claim 11, wherein the authorizing further comprises permitting delivery of the content to the display device based on determining the subscriber account data comprises the content source device as a secondary subscriber.

14. The method of claim 11, wherein the authorizing further comprises approving the content based on a parameter defined by the subscriber account data.

15. A computer readable storage device having stored thereon computer executable instructions that, in response to execution, cause a device comprising a processor to perform operations, the operations comprising:
receiving content from a content source device;
determining, from subscriber data, whether a subscriber account associated with the content is associated with a primary subscriber account,
wherein the subscriber data comprises first data representing a primary subscriber account and second data representing a set of secondary subscriber accounts; and
delivering the content to a display device utilizing a femto cell access point device linked to the primary subscriber based on the subscriber account being determined to be associated with the primary subscriber account.

16. A computer readable storage device of claim 15, wherein the operations further comprise validating that the subscriber account allows the content to be delivered to the display device.

17. A computer readable storage device of claim 15, wherein the operations further comprise authorizing the content to be delivered to the display device based on a quality of service requirement determined for a set of wireless network devices to which service is provided by the femto cell access point device.

18. The method of claim 11, wherein the access protocol further comprises:
another set of rules relating to
determining, based on the subscriber account data, whether a subscriber account associated with the content is associated with a primary subscriber account, wherein the subscriber account data comprises first data representing a primary subscriber account and second data representing a set of secondary subscriber accounts; and
delivering the content to the display device utilizing a femto cell access point device based on the subscriber account being associated with the primary subscriber account.

19. The method of claim 18, wherein the subscriber account data further comprises a subscriber record comprising first information related to the primary subscriber account and second information related to delivery settings for the primary subscriber account.

20. The computer readable storage device of claim 15, wherein the operations further comprise formatting the content to be consistent with a specification of the display device.

* * * * *